US006411936B1

(12) United States Patent
Sanders

(10) Patent No.: US 6,411,936 B1
(45) Date of Patent: Jun. 25, 2002

(54) ENTERPRISE VALUE ENHANCEMENT SYSTEM AND METHOD

(75) Inventor: Aaron M. Sanders, Wellesley, MA (US)

(73) Assignee: NVal Solutions, Inc., Dover, DE (US)

( * ) Notice: Subject to any disclaimer, the term of this patent is extended or adjusted under 35 U.S.C. 154(b) by 0 days.

(21) Appl. No.: 09/246,081

(22) Filed: Feb. 5, 1999

(51) Int. Cl.[7] .............................................. G06F 17/60
(52) U.S. Cl. ............................... 705/10; 705/1; 705/7; 705/500
(58) Field of Search ............................ 705/10, 1, 500, 705/7

(56) References Cited

U.S. PATENT DOCUMENTS

| | | | |
|---|---|---|---|
| 5,278,751 A | * 1/1994 | Adiano et al. | 364/402 |
| 5,398,300 A | 3/1995 | Levey | 395/22 |
| 5,406,477 A | 4/1995 | Harhen | 364/401 |
| 5,418,943 A | 5/1995 | Borgida et al. | 395/600 |
| 5,446,883 A | 8/1995 | Kirkbride et al. | 395/600 |
| 5,493,729 A | 2/1996 | Nigawara et al. | 395/61 |
| 5,551,022 A | 8/1996 | Tariq et al. | 395/600 |
| 5,555,403 A | 9/1996 | Cambot et al. | 395/600 |
| 5,566,291 A | * 10/1996 | Boulton et al. | 395/161 |
| 5,579,471 A | 11/1996 | Barber et al. | 395/326 |
| 5,594,638 A | 1/1997 | Iliff | 395/203 |
| 5,890,133 A | * 3/1999 | Ernst | 705/7 |
| 5,909,669 A | * 6/1999 | Havens | 705/11 |
| 5,924,072 A | * 7/1999 | Havens | 705/1 |
| 5,963,910 A | * 10/1999 | Ulwick | 705/7 |
| 6,061,662 A | * 5/2000 | Makivic | 705/36 |

FOREIGN PATENT DOCUMENTS

| | | | | |
|---|---|---|---|---|
| AU | 200060960 A | * | 2/2001 | G06F/17/60 |
| JP | 09305677 | * | 11/1997 | G06F/17/60 |
| JP | 2001125962 A | * | 5/2001 | G06F/17/00 |
| WO | WO 00/46721 | * | 8/2000 | G06F/17/60 |

OTHER PUBLICATIONS

Buckman, Robert H., "Knowledge Sharing At Buckman Labs", Journal of Business strategy, Jan./Feb. 1998, pp. 11–15.

"Chevron:'Knowledge management is now a business necessity', says Chevron chairman," Electronic reprint of article from M2 Presswire, Jan. 12, 1999, pNA.

Craig, Robert, "Knowledge Management: Reality or Wannabe? (Technology Information)", ENT, Jan. 6, 1999, vol. 3 il p. 26, Boucher Communications.

Eynon, Jim and Vance, David, "Putting the Knowledge into Knowledge Management", "Emerging Information Technologies," pp. 414–419 (1998 IRMA International Conference).

Kamel, Ahmed; Nazif, Ahmed; El–Dessouki, Ossama, and Kamel, Nabil, "MCFS: A Multiple Criteria Reasoning Fuzzy Expert Systems Building Tool", Oct. 29–Nov. 2, 1990, pp. 605–610, (Proceedings 14th Annual International Computer Software and Applications Conference).

(List continued on next page.)

Primary Examiner—Tariq R. Hafiz
Assistant Examiner—Akiba Robinson-Boyce
(74) Attorney, Agent, or Firm—Eugene Stephens & Associates

(57) ABSTRACT

An enterprise value enhancement system, method, and apparatus that uses an enterprise value enhancement model based on planning loop structures. The system receives field feedback input from users in response to surveys generated by a field feedback survey generator. A switchboard in the system sends this feedback, as well as data from one or more databases, to parts of the system including a performance processor, a customer asset valuation processor, a performance metrics engine, and a value enhancement solution generator, which generates value enhancement solutions and delivers recomended solutions for value enhancement of the enterprise, with linkages to specific functions.

61 Claims, 16 Drawing Sheets

OTHER PUBLICATIONS

Malhotra, Yogesh, PhD, "Tools @ Work, Deciphering the Knowledge Management Hype", Electronic reprint of article from "Journal for Quality & Participation", Jul./Aug. 1998, vol. 21, No.4, pp. 58–60, from http://www.brint.com/km/whatis.htm, Jan. 28, 1999.

Manasco, Britton, "Leading Firms Develop Knowledge Strategies", Knowledge Inc., Oct., 1996 (electronic reprint from http://webcom.com/quantera/Apqc.html, Jan. 28, 1999).

Murray, Peter and Myers, Andrew, Electronic reprint of article "The Facts About Knowledge", found at website "http://www.info-strategy.com.knowsur1/".

Prusak, Larry, "Visual Thinking with Larry Prusak: A pictorial Interview by Stuart Silverstone", Electronic reprint from Knowledge Management website, "http://enterprise-.supersites.net/kmmagn2/km199901/workf1.htm".

Shapiro, "Medicine, AI in," "Encyclopedia of Artificial Intelligence", 2nd Edition, vol. 2, Published 1992 by John Wiley & Sons, Inc.

* cited by examiner

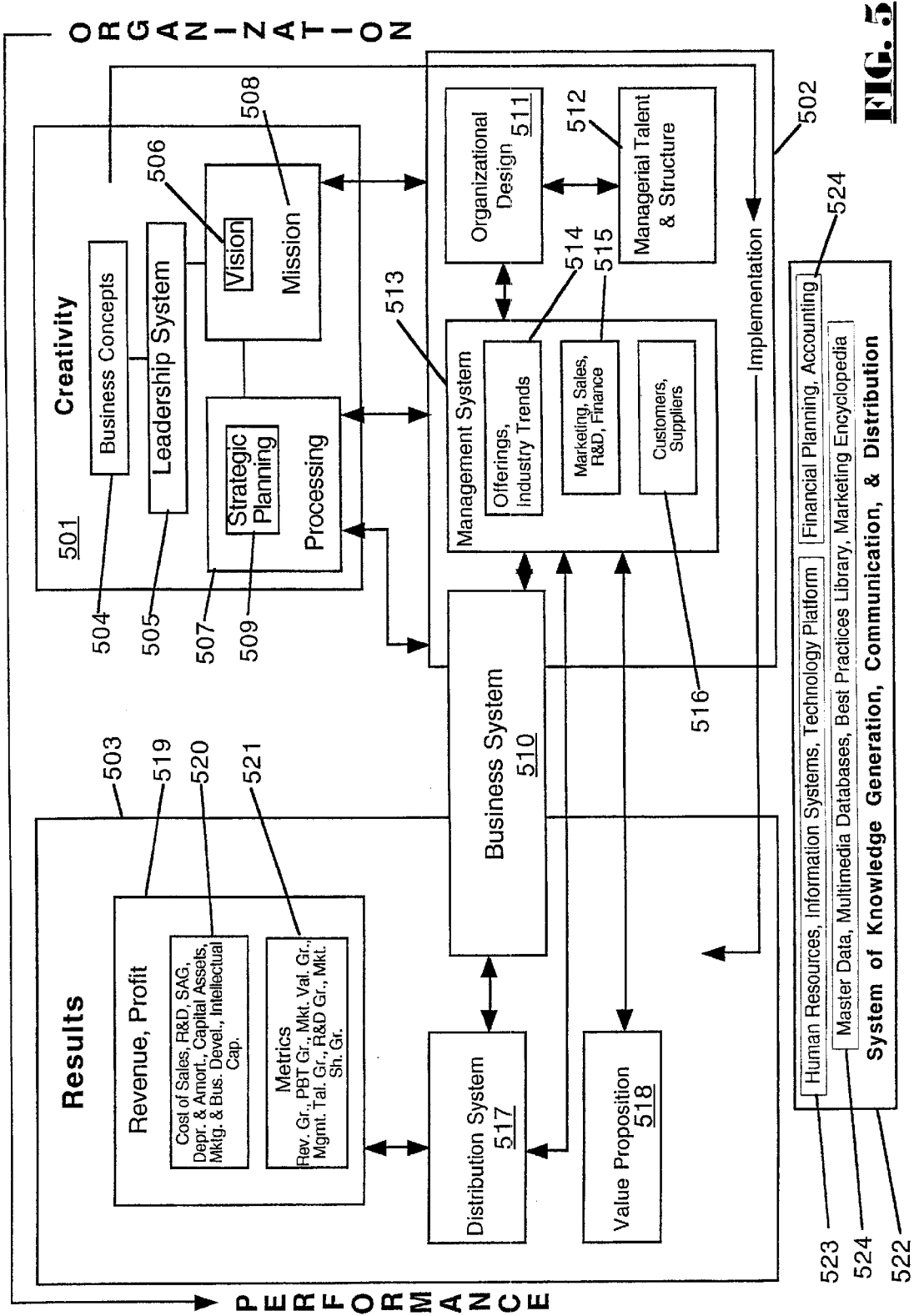

Table I

Stack Ranking by 5 Yr. Sales Growth Rate (SG)

| Company | Symbol | Business | Employees | Sales ($M) | Mkt Val | SG (5 Yr.) | MV/Emp($M) |
|---|---|---|---|---|---|---|---|
| DNAP Holding Corp. | DNAP | Agribusiness | 589 | 274 | 72 | 956 | 0.12 |
| Risk Capital Holdings | RCHI | Casualty Reinsurance | 37 | 142 | 411 | 908 | 11.11 |
| Healthdyne Information Enterprises | HDIE | Computer Integration Systems Design | 127 | 117 | 75 | 927 | 0.59 |
| Vanguard Airline | VNGD | Low-fare Passenger Airline | 486 | 81 | 64 | 849 | 0.13 |
| Arqule | ARQL | Pharmaceutical Preparations | 159 | 20 | 158 | 824 | 0.99 |
| Iona Technologies | IONAY | Software & Programming | 252 | 49 | 683 | 309 | 2.71 |
| EMC Corp. | EMC | Computer Storage Devices | 6400 | 3200 | 22300 | 182 | 3.48 |

Stack Ranking by 5 Yr. Income Growth Rate (IG) and Earnings Growth Rate (EG)

| Company | Symbol | Business | Employees | Sales ($M) | Mkt Val | SG (5 Yr.) | MV/Emp($M) |
|---|---|---|---|---|---|---|---|
| Risk Capital Holdings | RCHI | Casualty Reinsurance | 37 | 142 | 411 | 908 | 11.11 |
| Remedy | RMDY | Software | 226 | 137 | 472 | 132 | 2.09 |
| Innnovex | INVX | Electronic Components | 893 | 134 | 192 | 41 | 0.22 |
| Sapient Software | SAPE | Web-based Applications | 817 | 102 | 1370 | 162 | 1.68 |
| Smart Modular Technologies | SMOD | Semiconductors | 636 | 804 | 635 | 124 | 1.00 |
| RTW | RTWI | Marine Insurance | 302 | 92 | 91 | 107 | 0.30 |
| CKS Group | CKSG | Business Services | 271 | 145 | 356 | 71 | 1.31 |
| Radisys | RSYS | Process Control | 511 | 131 | 166 | 68 | 0.32 |
| Wyndham Hotel Corp. | WYN | Since Merged | 11400 | 148 | 971 | 27 | 0.09 |
| ITT Corp. | ITT | Since Merged | 38000 | 6225 | 8700 | 12 | 0.23 |

Table 2

Stack Ranking by Sales, Income & Earnings Growth - >100% (each), >$1M Cash from Ops. & <1500 Employees

| Company | Symbol | Business | Employees | Sales ($M) | Mkt Val SG (5 Yr.) | MV/Emp($M) |
|---|---|---|---|---|---|---|
| Arterial Vascular Engineering | AVEI | Medical Equipment & Supplies | 869 | 228 | 2400 | 2.76 |
| Amer Disposal | ADSI | Solid Waste Services | 1000 | 148 | 1000 | 1.00 |
| Andrx Corp. | ADRX | Controled Release Drugs | 384 | 170 | 568 | 1.48 |
| Vantive Corp. | VNTV | Front-office Automation | 351 | 131 | 360 | 1.03 |
| Newcom | NWCM | Computer Peripherals | 73 | 94 | 88 | 1.21 |
| Also, RCHI, RMDY, SAPE and SMOD | | From Above | | | | |

Stack Ranking of High Earnings Growth Business Services Companies - Profit-making & <1000 Employees

| Company | Symbol | Business | Employees | Sales ($M) | Mkt Val SG (5 Yr.) | MV/Emp($M) |
|---|---|---|---|---|---|---|
| Diamond Technology Partners | DTPI | Consulting | 180 | 58 | 280 | 1.56 |
| Aris Corp. | ARSC | Computer Related Services | 593 | 66 | 308 | 0.52 |
| Forrester Research | FORR | Market Research | 240 | 45 | 240 | 1.00 |
| Metagroup | METG | Information Services | 310 | 56 | 247 | 0.80 |
| Identix | IDX | Computer Peripherals | 143 | 74 | 167 | 1.17 |
| SOS Staffing | SOSS | Staffing & Consulting | 776 | 239 | 231 | 0.30 |

Table 3

Information

- Market Value per Employee of the 2 most valuable companies [6/30/98]
  - ☐ GE        $300B   1.1   $M/Emp.
  - ☐ Microsoft  $275B  12.4  $M/Emp.
- Less than 0.5% of all companies have market value/employee >$1M
- Less than a dozen companies have a market value/employee >$2M

ENTERPRISE VALUE ENHANCEMENT SYSTEM AND METHOD

TECHNICAL FIELD

This invention pertains generally to the field of knowledge-based computer and processing systems and more particularly, to the field of knowledge management systems, model driven decision support systems, and data and information driven decision support tools for enterprise value enhancement.

BACKGROUND OF THE INVENTION

The intellectual assets of a corporation are typically three to four times the tangible book value. With roughly 15% of the US workforce employed in the information sector today, the knowledge industry represents 33% of GDP and generates more than 50% of all corporate profits. Knowledge has essentially become the primary ingredient of whatever is made, done, bought and sold. Value creation in the enterprise is thus becoming increasingly dependent on "knowledge productization," which in turn is driven by knowledge activity. Growth, therefore, can be achieved only through increased knowledge activity.

Despite this trend, less than 2% of the number of major corporations grew total shareholder return by more than 35% per year over the last decade, and less than 1% of all companies grew earnings by more than 50% per year over the last five years. One of the major factors responsible for this is the lack of sufficient knowledge management systems for enterprise value enhancement.

Enterprise value enhancement, a business and knowledge management process to dynamically improve enterprise-wide business results—and thereby continuously renewing and increasing the fundamental value of the enterprise, has become more challenging than ever before for senior management. The business environment is increasing in complexity and uncertainty, and product and industry life cycles are becoming shorter. Moreover, as the business world becomes more digitally connected, the need for dynamic mass-customized solutions to add value seems to be on the rise. FIG. 1 shows the evolution of value-adding mechanisms over time.

Value creation in the enterprise has thus far been predominantly a passive strategy responding to market movements rather than a proactive strategy pervading all functions and occurring throughout the enterprise by identifying all the opportunities and all the spaces in which to add value. FIG. 2 presents a unique way to visualize the process of value creation, which is in many ways similar to filling a large room with Ping-Pong balls. As demonstrated, different ways of aligning and orienting the balls along the walls of the room yield significantly different counts of balls that can fit the exact same room dimensions. Value creation is dependent upon strategy, and the notion of strategy as "the gentle art of re-perceiving" does make strategy an inherently creative process, but business creativity is much broader in that it encompasses both innovation and entrepreneurship.

Creativity is how value is derived from new ideas and the processes by which those ideas are developed, typically following the commercialization process, the steps of which are outlined in FIG. 3.

The delivery of enterprise value enhancement on an on-going basis with certainty is becoming more difficult in the fast-changing business landscape primarily because value enhancement is still an art rather than a science. The essential contributors and drivers of value enhancement are still the humans with expertise retained within themselves and upon whom a heavy reliance for knowledge transformation is placed, despite great technological advancements. The 'fishschool' effect, where everyone follows a mission or direction regardless of whether the overall strategic objectives are being met at every step along the way, is ideal for project implementation and is therefore even desired for effective project management. Value enhancement, on the other hand, is essentially a process of continually gathering innovative ideas across the enterprise, integrating them seamlessly with strategic initiatives, and then deploying them through 'implementation solutions' based on enterprise potential and desired speed, the latter two factors linked to the resources available to the enterprise in question. A value enhancement perspective results in continuously optimized value delivery through all the elements of the value add cube as can be seen in FIG. 4. Enterprise value enhancement is thus a function of strategy, marketing, finance, and the collective application of enterprise creativity and knowledge assembled in a flow designed for continuous renewal and dependent, among other factors, upon flow rates and queues.

Knowledge has been defined as an opinion, idea or theory that has been verified empirically and agreed upon by a community. In a sense, it is defined as a justified, true belief and this view ignores tacit knowledge. Management on the other hand is the cyclical process of planning, organizing, action, control and feedback. Knowledge management is a discipline that promotes an integrated approach to identifying, managing and sharing all of the information assets in the enterprise, including databases, documents, policies and procedures as well as unarticulated expertise and experience resident in individual workers. Knowledge itself is an elusive asset which is why knowledge management, a discipline that manages and improves the organizational learning process, must be baked into the enterprise. The human factor is very critical and knowledge management, for all its importance, is still maturing.

The recent focus of knowledge management systems has been on effective information access that improves and speeds up the learning process, and such systems facilitate the collection, organization and transfer of knowledge aided by search engines, relational and object databases, GroupWare and other technologies. The core component of current knowledge management systems is the knowledge warehouse, and the emphasis is mainly on explicit knowledge. Knowledge, however, in the broadest sense, resides mostly inside people, with their portfolio of know-how, memory of past solutions, understanding of what works well, and their ability to see patterns and come up with fresh solutions that have a high probability of success. An enterprise needs to be well stocked with such tacit knowledge. The need today is for streams of ideas that can continuously enhance value or, in other words, knowledge flow with a focus on value creation.

Enterprise value enhancement, which pertains to the field of knowledge management, enables an entire organization to be collectively engaged in the process of contributing to the knowledge generation, knowledge communication and knowledge distribution process, the essential steps in productizing knowledge, whether for a product or for a service. Knowledge generation is fueled by knowledge communication across the enterprise, and value addition ultimately takes place through the transformation of knowledge activity into offerings, namely through the process of knowledge distribution. Enterprise value enhancement thus depends upon the systematic extraction of explicit and tacit knowledge within the enterprise and its continuous conversion to new, value through the creativity process via highly efficient implementation methodologies eliminating the typical knowledge "siloing" effects that tend to take place in corporate settings.

It is estimated that less than one-fifth of all intellectual capital available to an enterprise is actually utilized. The gross under-utilization of this very important knowledge resource occurs for various reasons some of which are sub-optimized organizational structures, lack of systems for capturing creativity, and interspersed 'human elements' such as the lack of motivation and the presence of ego. Opportunities for innovation, which is invention realized or commercialized, do not emerge from sophisticated analysis of data or from a rearrangement of existing information into different formats—they emerge from experiences and insights and mostly in environments that encourage creativity. Enterprise value enhancement is about the systematic collective application of enterprise creativity and knowledge leveraged to chart future actions designed to deliver on-going value propositions that result in a continuous maximization of the value of the enterprise over the long term.

What shapes history is the environment, the happenings, and the perceived effects, the environmental dynamics causing the happenings in turn to determine the perceived effects. Based on this model of influences, events and experiences connected by carriers, a value enhancement model is derived as depicted in FIG. 5. The extent and speed of value enhancement within the enterprise is a function of the knowledge activity, i.e. the content, the quality and the speed of knowledge transformation. In other words, value enhancement is dependent upon the generation of knowledge, the communication of knowledge and the distribution of knowledge within and outside the business system of the enterprise, and its seamless integration to the leadership, management, business and distribution systems.

Value enhancement focuses on the enterprise in its entirety rather than only on one specific aspect or area like marketing, finance or strategy, or for only a specific purpose like computing a range of future values. This new multidimensional approach provides a systematic methodology for capturing creativity, enabling knowledge generation, knowledge communication and knowledge distribution, and dynamically re-balancing all of these with the leadership system, organizational design, management system and distribution system of the enterprise. Observed from the value enhancement view, the principles of offering design take on a new perspective (FIGS. 6A and 6B) and the demand creation process (FIG. 7) appears to become a more complex and highly interconnected web—similar to an economic web. Armed with such a value-enhancement perspective leads to a greater understanding of value drivers and perhaps enables one to make appropriate and rapid improvements in the relevant processes and sub-processes. Similarly, the employee contribution chain (FIG. 8) highlights the key elements that drive employee motivation to enable performance at higher levels of employee discretionary effort. Although intuitive to some, these new insights can certainly aid in the value addition process if factored in systematically. In most firms though, management practices do not attempt to go deep enough to understand the value drivers in the total context of the enterprise.

A recent study of market valuations, financial performance over the past five years, and value propositions and strategies of approximately 11,000 publicly listed companies revealed that value-driven companies have some unique characteristics in common. These are (a) exceptional value propositions derived from creativity and trends in the landscape, (b) cohesive organizational structures with efficient knowledge flow enabling near-flawless implementation, and (c) high-sales, high-income or high-earnings growth rates. The first two characteristics led to the third naturally in some cases, but the reverse was not found to be true; moreover, each of these characteristics, for the most part, were found to be independent. Companies with such characteristics are not the well-known companies that we read about frequently but are the cohesive, well-knit companies that have mastered the generation, communication and distribution of knowledge, creating exceptional market values per employee as a result. Market value per employee is an appropriate metric that can easily help determine the net value addition per person employed in the enterprise as discounted by market forces—and we are already beginning to see how important intellectual capital is becoming and how it is being reflected primarily through market valuations today.

Table 1 depicts the stack rankings of companies with the highest sales growth rate, the highest income growth rates and the highest earnings growth rates, all observed separately. These are derived from the same pool of over 11,000 companies at the end of the second quarter of 1998. Table 2 is a similar stack ranking of high sales, high income and high earnings growth rate companies (this time all three factors combined), leading to a different list. This list yields companies with consistently high market values per employee, and in fact exceeding $1M/person as in end-June 1998. Another set of companies with relatively high market values per employee were among those focused on specific business services by providing unique value propositions. These companies, however, did not necessarily have very high growth rates.

Profit-making and growing companies (as defined here by companies with positive cash flow from operations and with at least a 10% average revenue growth per year over the last three years) represent a mere 20% of the total pool. A market value of $1M/employee, to put in perspective, is three times the average of all profit-making and growing companies and indicates membership in the cream of the population. GE, valued at roughly $300B—which became the most valuable company in the US surpassing the valuation of Microsoft in mid-1998—has a market value per employee of over $1M; see Table 3. General Motors, by contrast, which is neither in a knowledge-based business nor in a high growth mode, has a market value per employee of less than $0.1M.

The foregoing study leads to the conclusion that there is a definite correlation between the value enhancement characteristics described above and high per employee market valuations. While high valuations are desirable and for many boards the ultimate goal, continuously creating exceptional value propositions and enabling high degrees of knowledge activity and efficient knowledge flow in organizational structures over time is a more difficult task. The model shown in FIG. 9 is a process that would be helpful for managers to follow to enable just that.

Developing business processes without mechanisms to add value is short-term. Similarly, developing corporate strategy without insights is dangerous because it leads to unrealistic plans. Defining purpose, discovering insights and combining the two into strategy is hard enough for many companies which is apparent when we see how competitive forces are shortening life-cycles. Electronic commerce has created a new environment in which new opportunities exist for innovative ways to add value. Strategy formulation as well as knowledge management are still evolving and present somewhat of a puzzle in many organizations even today. An even more complex process, however, is the value enhancement process, which requires creativity resulting from higher levels of knowledge activity and knowledge flow to be the fuel for systematic incremental value addition. By adopting the application methodology of the enterprise value enhancement model, managers can have a useful framework for channeling efforts in the direction of tacit knowledge led value enhancement.

Strategic planning initiatives are an important and critical aspect of an organization's success, but they still comprise only one of the many decision support tools required for the management of an enterprise. The emotional side of strategy has been ignored too often in spite of the fact that strategy is as much about experimentation as it is about foresight and passion. In many organizations the quest for efficiency drives out experimentation and the ability to listen to the voice of the customer. This is one reason why disruptive technologies have managed to displace so many corporations in their entirety.

Work has been done in the past on developing systems which enable projections pertaining to markets, expected sales, costs, the economy in general, changes in the state of technology, emerging product technology and political influences among others to provide decision support for resource allocation purposes. In these cases also, there is a variety of incomplete and inconsistent information from many different sources that have to be reasoned out and reconciled, and even in the presence of reconciliation rules and the like, these systems merely reorganize data and information for further processing and do not capture the creativity of the enterprise for ultimate conversion into value.

Future values of variables can be determined by some existing enterprise models which include flow relationships, causal relationships, compositional relationships and productivity relationships besides reasoning and reconciliation to create a realistic model of an enterprise. The prior art has addressed some of the problems by creating computer systems to generate plausible recommendations concerning the nature and amount of various resources that are required to supply the enterprise and to identify certain actions appropriate to acquire and develop these resources. The problem is that existing systems are based either on hierarchical models or are meant to enable decision-making regarding resource allocation only, and not for the larger purpose of overall enterprise value enhancement. Moreover, realistic value projections are difficult to make in some cases requiring complex reasoning and reconciliation, and as a result organizations rely heavily on manual processes with primary decision support coming from spreadsheet tools, word processing programs and electronic mail and the reconciliation dependent on the knowledge and expertise of managers.

The prior art has several limitations. While it can handle multiple reasoning, generate certainty factors, map inputs and outputs, and incorporate features of inference expert systems into continuous state feed-forward neural networks, it still cannot capture creativity or direct focus to areas requiring action for value enhancement. Expert systems lack the ability to learn from examples and neural networks find it difficult to deal with explanations. Moreover, expert systems rely primarily on hand-crafted rules as their "source of knowledge". Building an expert system also requires finding a human expert in the problem domain, translating the human's knowledge into if-then rules, and then debugging the rulebase. Therefore, in some cases, hiring or training additional experts may be less expensive than building expert systems.

Neural networks attempt to emulate the processing patterns of the biological brain and learn primarily by computation of confidence measures. They do not model human intelligence, they do not perform solutions and they do not aim to solve specific problems. Instead, they are designed with a generalized capability to learn and are certainly efficient at linear relationship mappings. However, the real world problems are far more complex and non-linear in relationship and mappings through neural networks can become difficult.

The prior art deals with heuristic learning application programs and its application to retrieval of heuristically documented solutions. These, however, have very limited applications as of date and are used primarily in locating records during a computer-telephony interface, e.g. retrieving medical records during a patient - medical advisor telephony interaction.

The prior art also does not consider the engagement, commitment, expertise and innovative inputs of the field nor does it incorporate any links such as marketing research, enterprise computing systems, knowledge bases and on-line expert advice-giving systems. The prior art also does not include any real time interactive features.

While most systems of the prior art address the problem of determining a future value, computing in a distributed network, or mapping relationships, they are essentially limited in that they allow access to specific databases for specific purposes of computation or reconciliation. The problem, however, is that information of interest lies in a complex combination of dynamic databases, and that there is data and information beyond the warehouse. The enhancement of enterprise value is dependent upon the proper understanding, utilization and integration of that complex combination of information together with the existing knowledge in the enterprise, the creativity of the enterprise and the enterprise model. This is precisely the problem that has not been fully addressed in the prior art. Thus, the creation of a system, method and apparatus for enterprise value enhancement is an advance that would have a wide range of use and application by senior managers.

SUMMARY OF THE INVENTION

The extent and speed of value enhancement in an enterprise will increasingly depend upon knowledge activity, by which I mean the content, the quality and the speed of knowledge transformation. In other words, value enhancement depends on the generation of knowledge, the communication of knowledge, and the distribution of knowledge within and outside the business system of the enterprise.

My invention provides a method and a system that focuses on the value enhancement of an enterprise in its entirety rather than on only one specific aspect or area, such as marketing, finance, or strategy. I use a globally networked total solution system that delivers enterprise value enhancement through solution sets most appropriate for execution by specific functions for delivery of enhanced value. A field feedback engine is part of the design of my enterprise value enhancement system and captures and optimizes engagement, commitment and expertise of the field for the best use of the enterprise to maximize value enhancement. Additionally, my inventive system allows for customization and personalization of solutions for enterprise value enhancement to a greater degree than does the prior art.

My value enhancement processing system captures the knowledge generation, communication, and distribution mechanism of the enterprise to speedily roll out solutions for value enhancement. The present invention overcomes the deficiencies of the prior art by delivering automated solutions for value enhancement, as well as tracking and updating results, feedback, and references continuously rather than merely projecting a future value for a given set of conditions or a set of values for the future for a given set of conditions based on preprogrammed rules of reconciliation for specific input queries.

In an exemplary embodiment of my inventive system, I include an input device for interactive input of field feedback via field feedback surveys created by a field feedback survey generator. The field feedback survey generator receives the field feedback and processes, renews, and updates enterprise value enhancement solution surveys based on the field feedback. A switchboard imports data from various databases or multimedia databases into the processing system. I also prefer to include a performance processor that assimilates the field feedback and the data imported by the switchboard to process linkages between the data, form clusters of elemental information, and make appropriate computations, associations, and new linkages. A customer asset valuation processor preferably receives relevant information to dynamically compute customer asset value and assign attributes to the customer assets as necessary. A performance metrics engine monitors metrics and the direction of movement of the metrics, as well as the accuracy of projections of the values of the metrics. My inventive system includes a value enhancement solution generator that receives data from the field feedback survey generator, the switchboard, the performance processor, the customer asset valuation processor, and the performance metrics engine and generates value enhancement solutions based on these data. The solution generator then delivers recommended solutions for value enhancement of the enterprise, with linkages to specific functions. The field feedback survey generator also generates the field feedback surveys used by the input device and updates the field feedback surveys.

My inventive system preferably performs a method of enterprise value enhancement including the steps of creating a value enhancement model of the enterprise based on planning loop structures, the planning loop structures each being a dynamic frame-based model, continuously updating and refining the value enhancement model of the enterprise, and providing a set of causals, logical explanations, and reconciliation rules to cross-link types of enterprise activities to causals, functions, and solutions. The method also includes steps of accepting input from a field survey administrator through an interface, providing a method of generating new field feedback surveys to capture individuals' knowledge by applying previous field feedback and linking to the types, causals, functions, solutions, and results from those solutions. Further, the method preferably includes accepting input pertaining to an account to determine key solutions for value enhancement as relevant to the account, applying the account specific information to the set of reconciliation rules of linkages between types, causals, functions and solutions, and providing a set of variable solutions customized for at least one of specific target customer accounts, specific target supplier accounts, market segments by type of account, and market segments by type of offering, and for specific functions to be executed in order to enhance overall enterprise value.

Various refinements of the system and the method it performs are also encompassed by my invention. In particular, a particular method can be executed in the planning loop structures including the steps of accepting a user interaction through a user interface, recommending a cost reduction process, determining a scope for higher value added products and services, tracking and determining a potential for movement in various metrics, providing solutions through the user interface to different functional groups in the enterprise, analyzing financial performance, generating new feedback formats, sending field feedback surveys automatically at preset frequencies to update information and current and desired states, collecting new field feedback, inputting the feedback into the performance processor, and generating new enterprise value enhancement solutions through a continuous closed loop process, thus renewing the potential for incremental value creation in successive time periods. Various refinements can be made to the planning loop structure method as well.

With my inventive system and method, productivity, efficiency of value can be enhanced beyond what is possible with prior art systems and methods. This improved enhancement results in part from the more successful capture of tacit knowledge by my system and method.

DESCRIPTION OF THE DRAWINGS

The invention is pointed out with particularity in the appended claims. However, other features will become apparent and the invention will be best understood by referring to the following detailed description in conjunction with the accompanying drawings in which:

FIG. 5 is a schematic representation of a preferred value enhancement model according to my invention.

Tables 1 and 2 show stack rankings of companies by four major categories as discussed above.

Table 3 shows some additional statistics and some conclusions derived from Tables 1 and 2, as well as from the additional statistics shown in Table 3 as discussed above.

DESCRIPTION OF THE INVENTION

Figure 1:
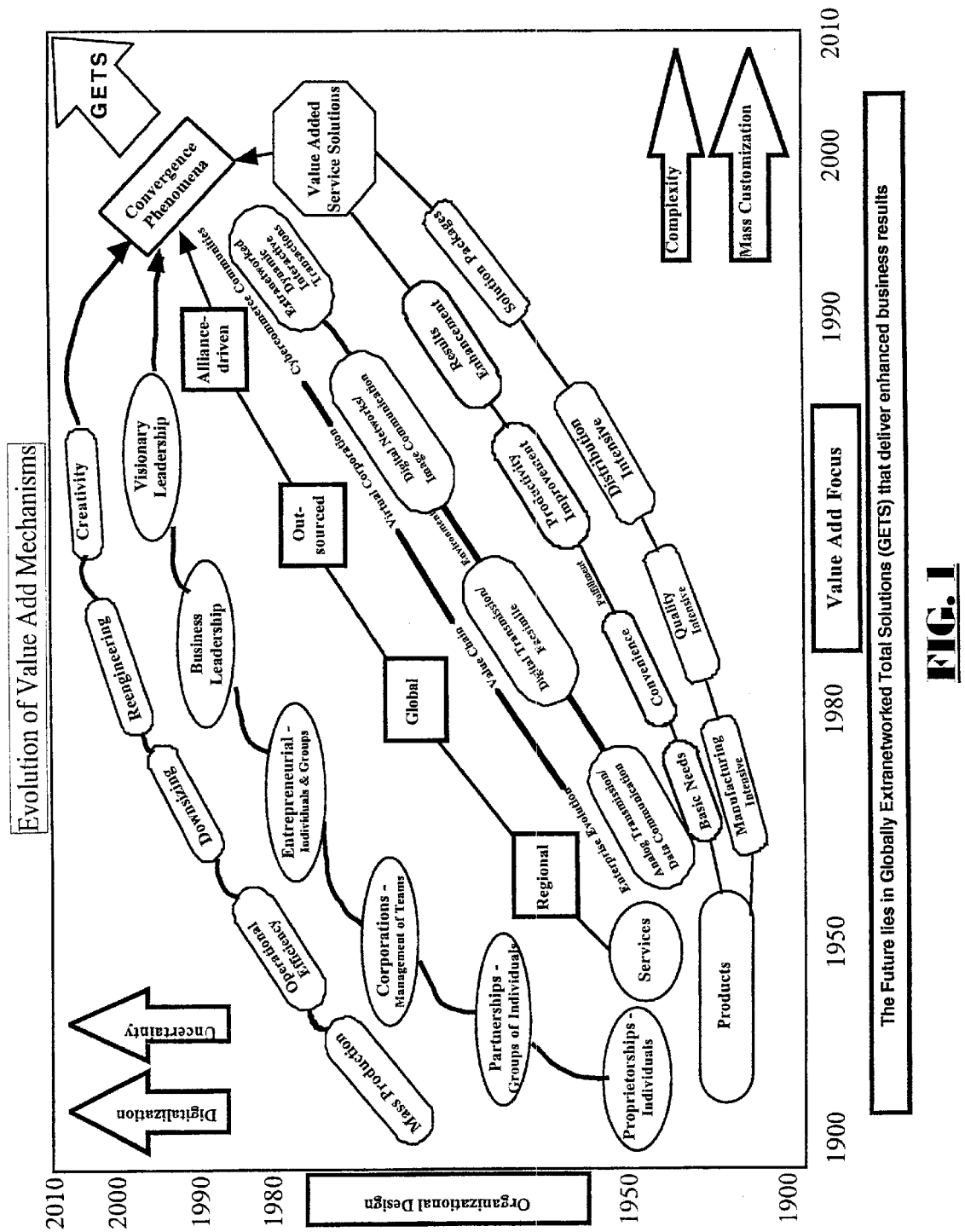
FIG. 1 is a chart representing the evolution of value add mechanisms from 1900 to 2010 as discussed above.
Figure 2:
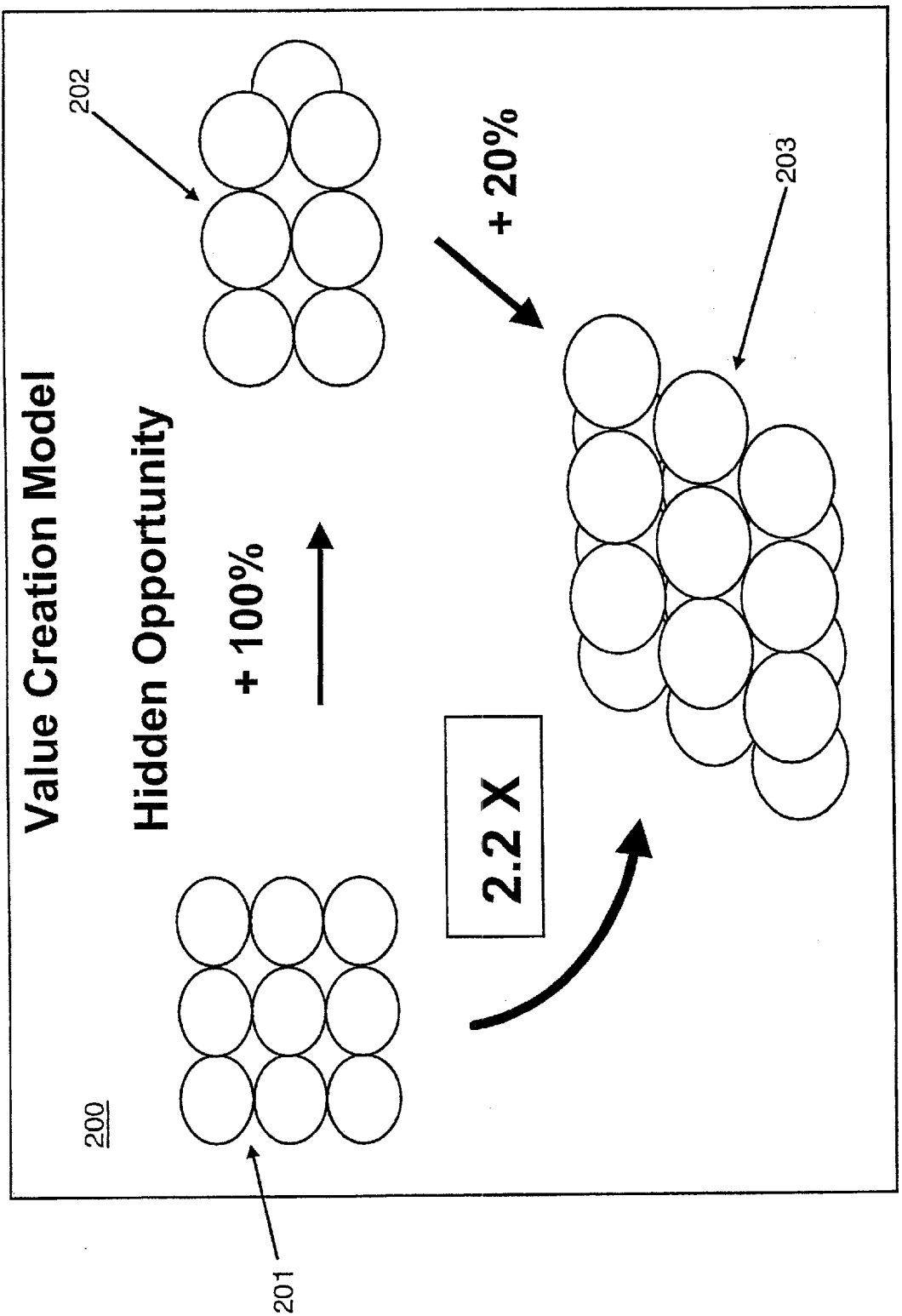
FIG. 2 is a schematic representing a value creation model as discussed above.
Figure 3:
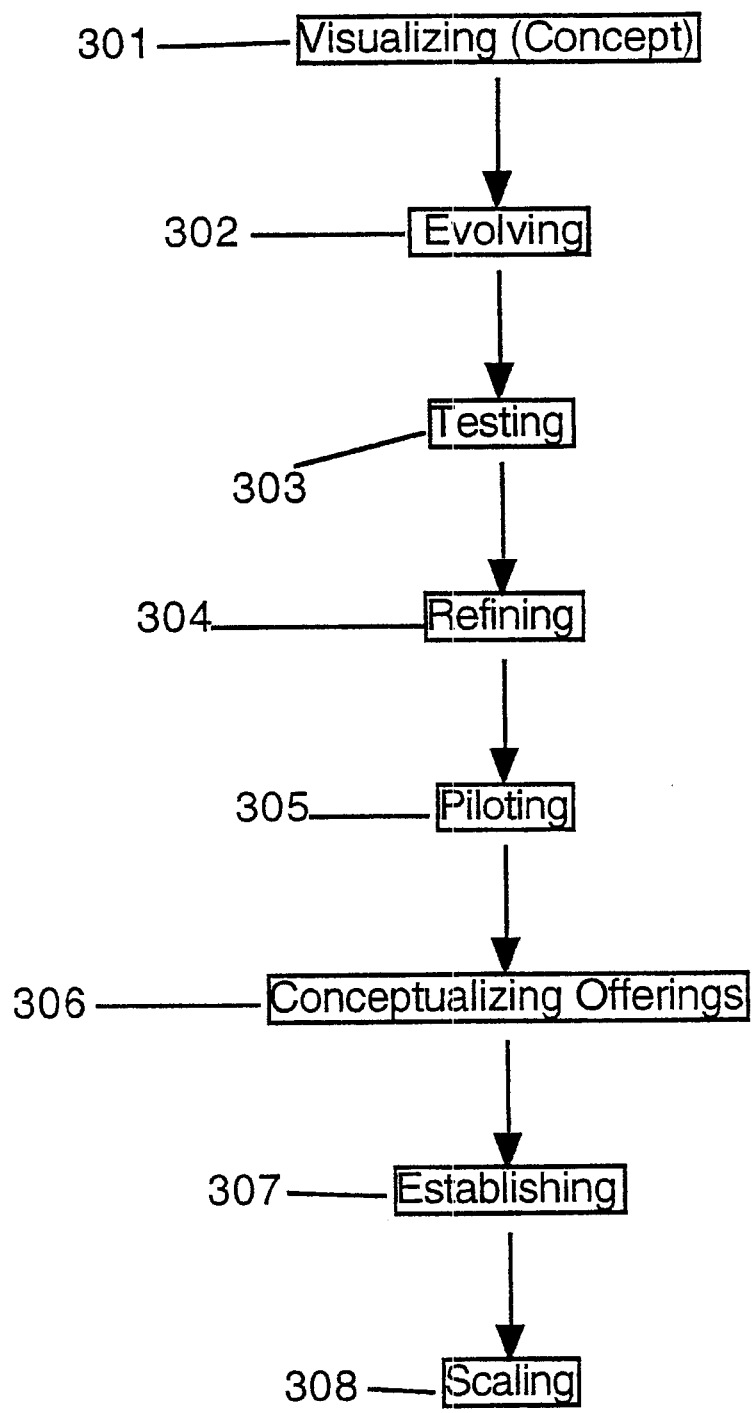
FIG. 3 is a schematic illustrating typical steps in a process of commercializing an innovation developed by an enterprise as discussed above.
Figure 4:
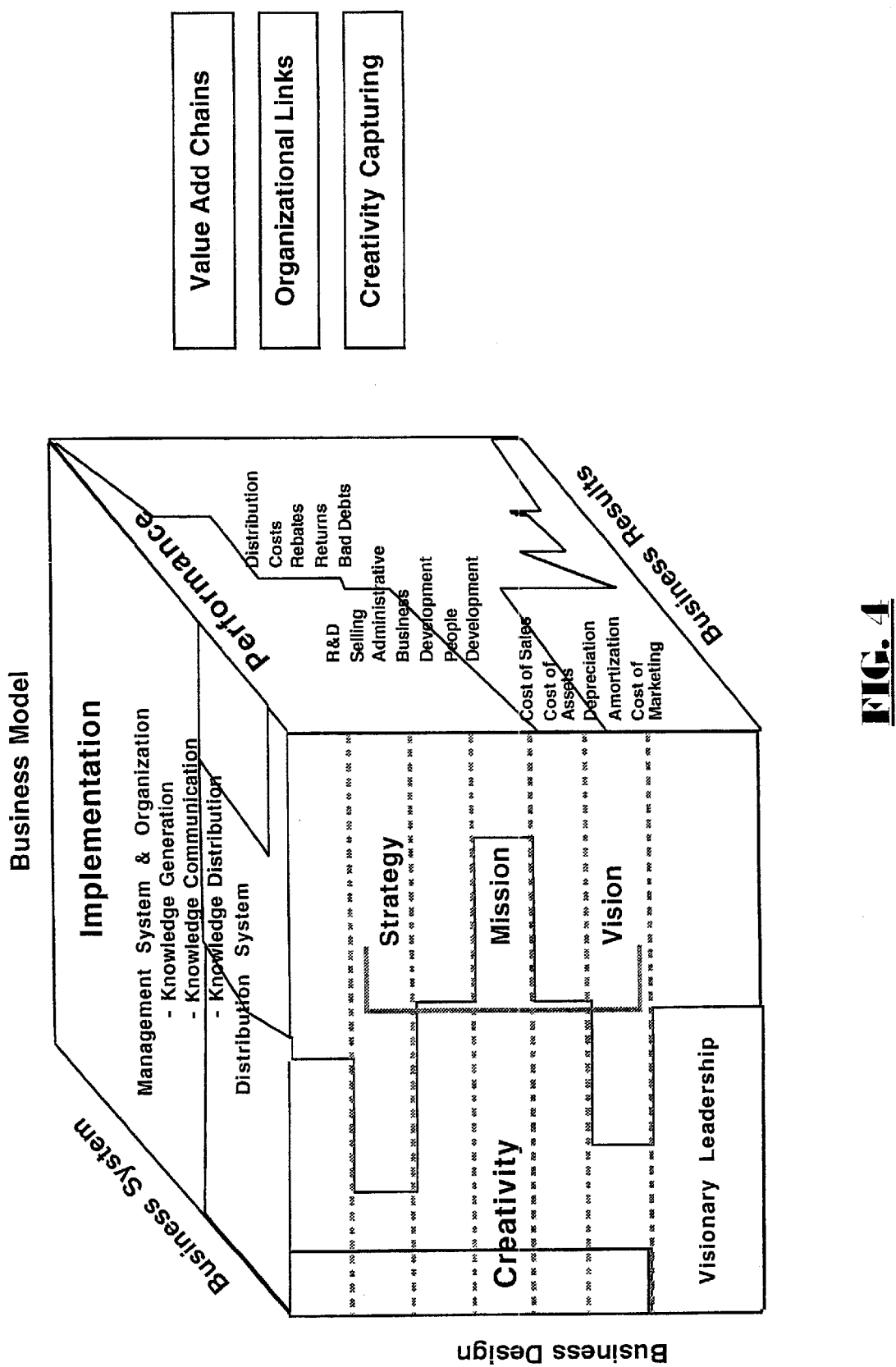
FIG. 4 is a schematic multidimensional chart illustrating the relationships between business design, business systems, business models, creativity, implementation, and performance in an enterprise according to my invention.

FIG. 4 is a multi-dimensional diagram of value enhancement according to my invention. The cube is useful here in that it allows the pictorial representation of the relationships between many aspects of an enterprise. Here, the principal axes depict the relationships between business design, business system, and business model of an enterprise. The visible faces of the cube show the media by which the dimensions are realized. Here, business design is realized through creativity and tacit knowledge management, business model is realized through implementation methodologies adopted and knowledge activity, and business system is realized through the value chain and efficiency of performance.

As particularly seen in FIG. 5, which is a schematic representation of the relationships shown in FIG. 4, my system for enterprise value enhancement focuses on three core areas of an enterprise in its value enhancement model: the medium of creativity 501, the dimension of implementation 502, and the medium of results/performance 503. Creativity 501 I define to include business concepts 504, the leadership system 505 deployed by the enterprise, the vision 506 of the enterprise, and the means by which all of these are processed 507. The vision 506 of the enterprise includes the enterprise mission 508, and the strategic planning 59, which falls under processing 505, includes processing of all their abstract concepts. The business system 510 of the enterprise falls between the implementation and results areas 502, 503 of the enterprise in my system.

As I define the implementation area 502 of the enterprise, it includes the organizational design 511, managerial talent and structure 512, and management system 513 of the enterprise. The organizational design 511 is interdependent with the managerial talent and structure 512 of the enterprise, as well as the mission 506 and vision 508 of the enterprise and the management system 513. The management system 513 is also interdependent with the strategic planning 509 and processing 507 of business concepts 504 of the enterprise, as well as several aspects of the results area 503 as will be described below. Offerings and industry trends 514, marketing, sales, research and development, and finance 515, and customers and suppliers 516 all fall under the management system 513 of the enterprise.

I define the results area 503 of an enterprise to include its distribution system 517, its value proposition 518, and its revenue and profit 519, including metrics 520, which in turn include dynamic states of the enterprise. I prefer to include as dynamic states of the enterprise its revenue growth, profit growth, market value growth, management talent growth, research and development growth, market share growth, and the growth of market valuation per employee, but other dynamic states can be used as well. The distribution system 517 I connect with the management system 513, the revenue and profit 519 and metrics 520 sections of the results area 503, and the business system 510. Cost of sales and service, research and development expenses, SAG (selling, administrative, and general expenses), depreciation, amortization, capital assets, marketing, business development, investments, and intellectual capital 521 I place under revenue and profit.

Three major categories of tools are also important to my system and are part of a system of knowledge generation, communication, and distribution 522. Each category includes databases, tools, and/or systems that an enterprise might employ. The first major category 523 includes the human resources, information systems, and technology platform of the enterprise. The second major category 524 includes the financial planning and accounting systems of the enterprise. And the third major category 525 includes the master data, multimedia databases, best practices library, and marketing encyclopedia of the enterprise.

Using the three main focus areas 501, 502, 503 and three major categories of tools 523, 524, 525 in the system for knowledge generation, communication, and distribution 522, value enhancement as applied by my system focuses on the enterprise in its entirety rather than only on one specific aspect or area like marketing, finance or strategy, or for only a specific purpose like computing a range of future values. This new multidimensional approach provides a systematic methodology for capturing creativity, enabling knowledge generation, knowledge communication and knowledge distribution, and dynamically re-balancing all of these with the leadership system, organizational design, management system and distribution system of the enterprise. Preferably, the knowledge generation, communication, and distribution are related through a relationship such as a polynomial equation or a differential equation. An example of such a relationship states that business results BR can be described by the formula $$K_5^P BR = \frac{KA \times K_1 KD_Q \times K_2 D_{Spd} \times K_3 D_{Sph} \times K_4 KD_C}{\text{Business Cycle}}$$

where $K_1 \ldots K_5$ are constants, KA is Knowledge Activity, $KD_Q$ is Knowledge Dissemination Quality, $D_{Spd}$ is Dissemination Speed, $D_{Sph}$ is the Sphere of Dissemination, and $KD_C$ is the total cost of Knowledge Distribution. Another such relationship is an equation for determining a measure of on-going capability of an enterprise to improve business results, the Value Enhancement Index, such as $$V_{EI} = [K_a(1 \pm \Delta P_G)^2 + K_b(1 \pm R_G)^2 + K_c(1 \pm \Delta MV_G)^2 +$$
$$K_d(1 \pm \Delta MS_G)^2 + K_e(1 \pm \Delta KA_G)^2 + K_f(1 \pm \Delta CAV_G)^2]^{\frac{1}{2}}$$

where f implies a function, $P_G$, $R_G$, $MV_G$, $MS_G$, $KA_G$, and $CAV_G$ are Profit growth, Revenue growth, Market Value growth, Market Share growth, Knowledge Activity Customer growth, and Asset Value growth, respectively, $\Delta$ is change relative states at two different time frames, $K_a \ldots K_f$ are constants. Also, Knowledge Activity is related to knowledge generation, communication, and distribution by KA=f ($K_{gen}$, $K_{com}$, $K_{dist}$), where $K_{gen}$ is the knowledge generation factor, $K_{com}$ is the knowledge communication factor, and $K_{dist}$ is the knowledge distribution factor.

Figures 6A, 6B:
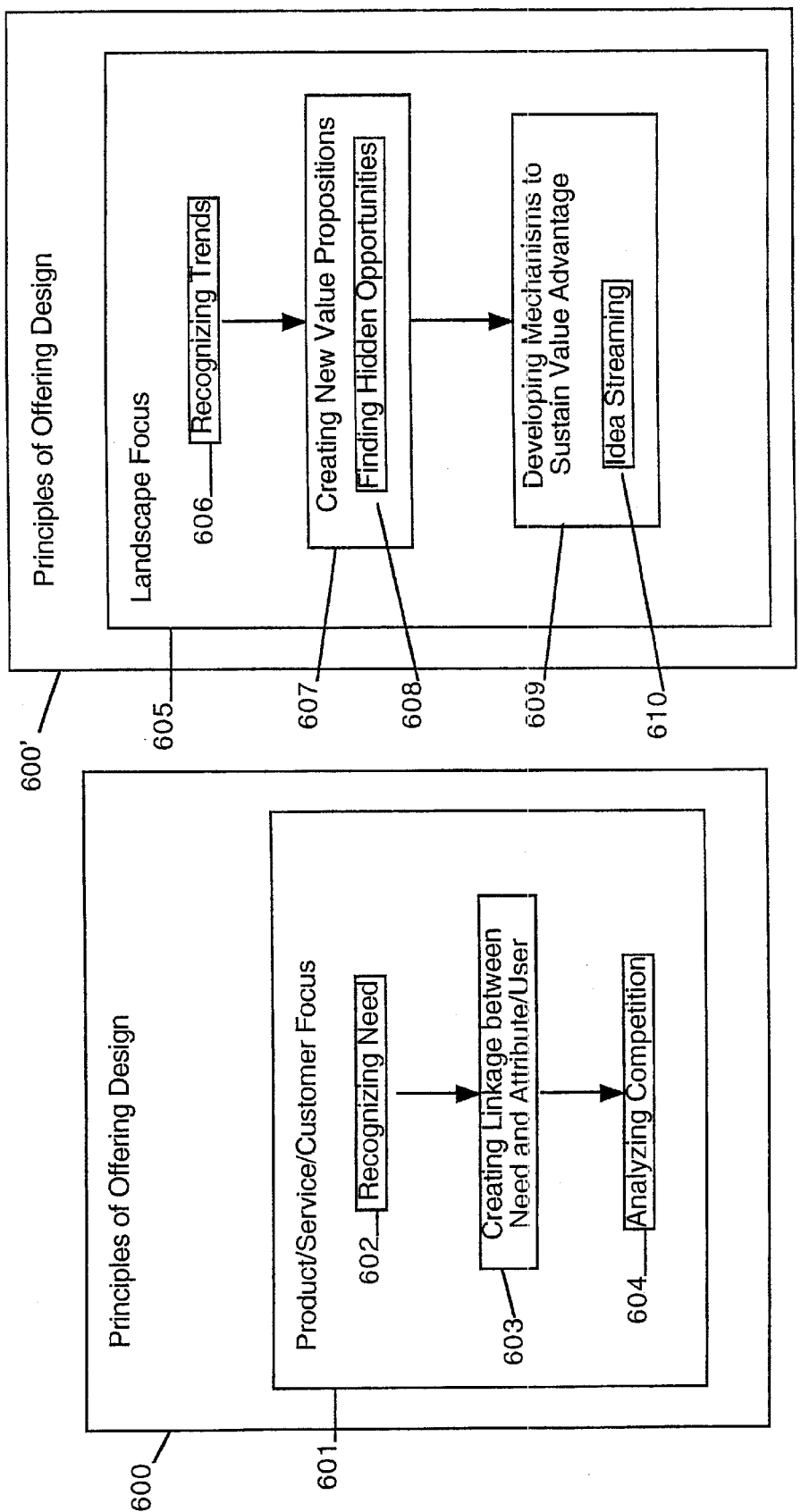
FIG. 6A is a schematic illustrating the principles of offering design in an enterprise according to the prior art.
FIG. 6B is a schematic illustrating the principles of offering design in an enterprise according to the instant invention.

Observed from the value enhancement view, the principles of offering design take on a new perspective as illustrated in FIGS. 6A and 6B. The important aspect of offering design 600, 600' according to my invention is the landscape focus 605, as shown in FIG. 6B, as compared to the focus on the products, services, and customers 601 of the enterprise, the latter focus being that of the prior art, as shown in FIG. 6A. The latter focus 601 typically includes recognizing need 602, creating linkage between this need and an attribute or user 603, and analyzing the competition 604. However, the landscape focus 605 applied by my invention encompasses the recognition of trends 606 within the industry as well as the enterprise. New value propositions are created 607 in the landscape focus by finding hidden opportunities 607 within these trends. Applying idea-streaming 610 to the identified trends 606 and the hidden opportunities 607, mechanisms are developed to sustain value advantage 609.

As described above, the product/service/customer focus 601 of offering design of the prior art includes the recognition of need 602. In this context, the recognition of need 602 is the need in the market for a product or service, the need by a particular customer for a product or service, and the need of the enterprise for a customer to purchase a product or use a service of the enterprise. Once needs have been recognized 602, a linkage is created between the need and the user or attribute 603. Finally, competition is examined and analyzed 604 to determine what must be done to competitively and profitably fulfill the recognized need.

Figure 7:
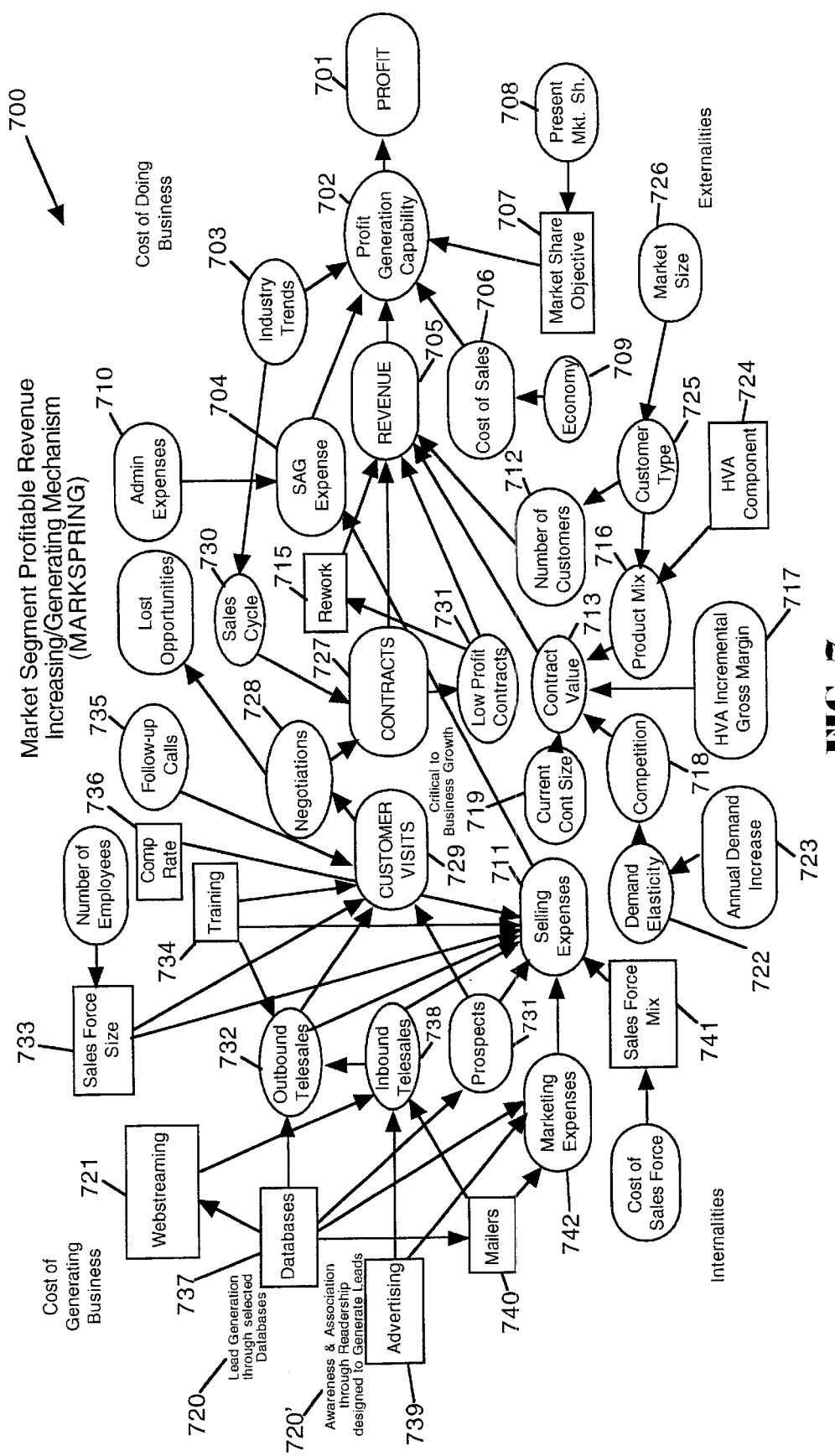
FIG. 7 is a schematic diagram illustrating a preferred process of demand creation from a value enhancement view according to my invention and shows the interdependence of a number of factors of an enterprise in such a process.

The demand creation process 700, shown schematically in FIG. 7, appears to become a more complex and highly interconnected web similar to an economic web. Being armed with such a value-enhancement perspective leads to a greater understanding of value drivers and perhaps enables one to make appropriate and rapid improvements in the relevant processes and sub-processes.

The end result of demand creation is profit for the enterprise 701. More specifically, the result is a maximization of profit and productivity per sales person, and it is derived directly from the profit generation capability 702 of the enterprise. The profit generation capability of the company is dependent on many factors, including industry trends 703, SAG expense 704, revenue 705, the costs of sales 706, and the market share objective 707 of the enterprise, which is based on the present market share 708 of the enterprise. The cost of sales 706 is dependent on the economy 709 in which the enterprise exists. While the enterprise may not have much control over the economy 709, the state of the economy can be taken into account when developing sales strategies. SAG expense 704 is dependent on administrative expenses 710 and selling expenses 711.

Revenue 705 is dependent in part on the number of customers 712 the enterprise has, as well as the value of contracts 713, 714 owned by the enterprise, and rework of contracts 715 held by the enterprise. Contract value 713 is in turn dependent on the mix of products and services 716 covered by the contracts (or purchase orders), the HVA (high value added) incremental gross margin products and services 717, competition for the customers party to the contracts 718, and the sizes of the contracts 719. My system links lead generation and awareness 720, including webstreaming 721, through all influences and entities affecting the ultimate profit generation capability of the enterprise. To more completely link lead generation 720 and awareness 720', my system can assess the amount of competition by analyzing demand elasticity 722 based in part on annual demand increase 723. Product mix 716 is determined by accessing an HVA component database 724 and the customer type 725, which in turn depends on market size 726, my preferred representative externality. While I prefer to use market size 726 as my representative externalities, other externalities could be used.

While contract value 713 is a factor used to compute revenue 705, the contracts themselves 727 are also analyzed in the computation/estimation of revenue 705. This analysis is based on negotiations 728, which depend on customer visits 729, and sales cycle 730, which depends on industry trend 703. The analysis of the contracts also yields a group of low profit contracts 731 that are listed as a separate category not necessarily used in the computation/estimation of revenue 705. Customer visits 729 are assessed in terms of prospects 731, outbound telesales 732, sales force size 733, training 734, and follow-up calls 735, which partly depend on comp rate 736. Prospects 731 are derived based on databases 737 selected by the user for lead generation.

Outbound telesales 732 are assessed in view of any number of databases 737 the user selects for lead generation, inbound telesales 738, and training 734. Inbound telesales 738 are generated by and/or depend on databases 737 selected by the user for lead generation, webstreaming 721, advertising 739, and mailers 740.

Selling expenses 711 are directly dependent on perhaps the greatest number of factors in my value enhancement view 700 and are computed based on input from a number of sources including a database describing the mix of the sales force 741. Marketing expenses 742, prospects 731, inbound and outbound telesales 738, 732, sales force size 733, training 734, comp rate 736, and webstreaming 721 are all taken into account to determine the extent of selling expenses 711. Marketing expenses 742 depend on the creation and maintenance of lead generating databases 720, 737, advertising 739, and mailers 740.

Figure 8:
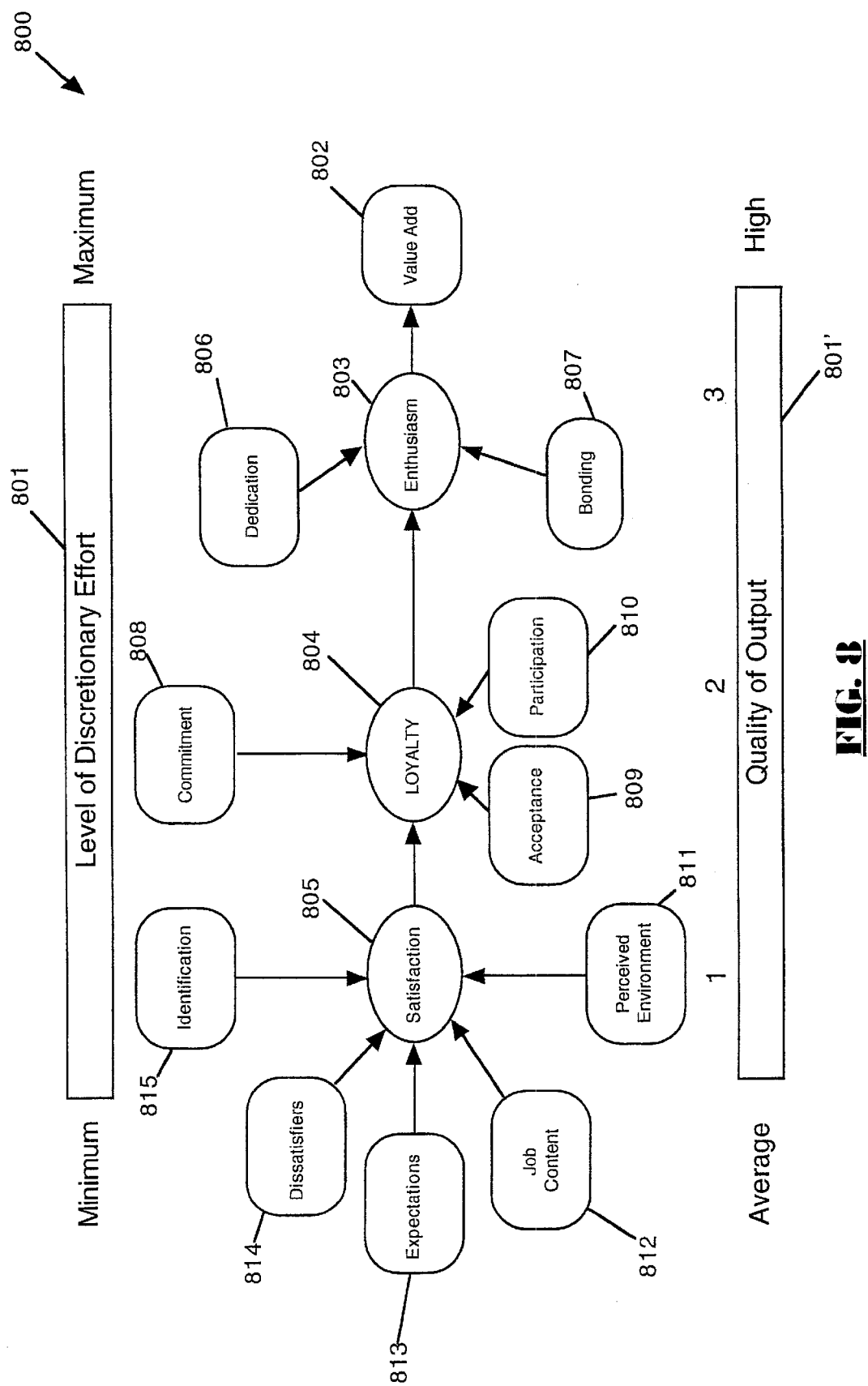
FIG. 8 is a schematic illustrating a preferred process of analysis of an employee contribution chain according to an embodiment of my invention.

Similar to the demand creation process, the employee contribution chain 800 schematically illustrated in FIG. 8 highlights the key elements that drive employee motivation to enable performance at higher levels of employee discretionary effort 801. These new insights can certainly aid in the value addition process if factored in systematically. In most firms, though, management practices do not attempt to go deep enough to understand the value drivers in the total context of the enterprise even though the quality of employee output varies with the level of discretionary employee effort, which will only occur when employees are motivated.

The major contributors to value addition 802 in the employee contribution chain according to my invention are employee enthusiasm 803, employee loyalty 804, and employee job satisfaction 805, as can be visualized along a motivation continuum as represented by the level of discretionary effort 801 and quality of output 801. For enthusiasm, my system estimates the level of employee dedication 806 and bonding 807 to make an assessment of employee enthusiasm. However, enthusiasm is also dependent on loyalty 804, which is dependent in part on satisfaction 805. To estimate loyalty 804, I make an assessment of employee commitment 808, acceptance 809, and participation 810. Determination of employee satisfaction 805 is somewhat more involved and requires estimates of employees perceived environment(s) 811, job content 812, employee expectations 813, items causing employee dissatisfaction (dissatisfiers) 814, and employee identification 815 with the enterprise.

Figure 9:
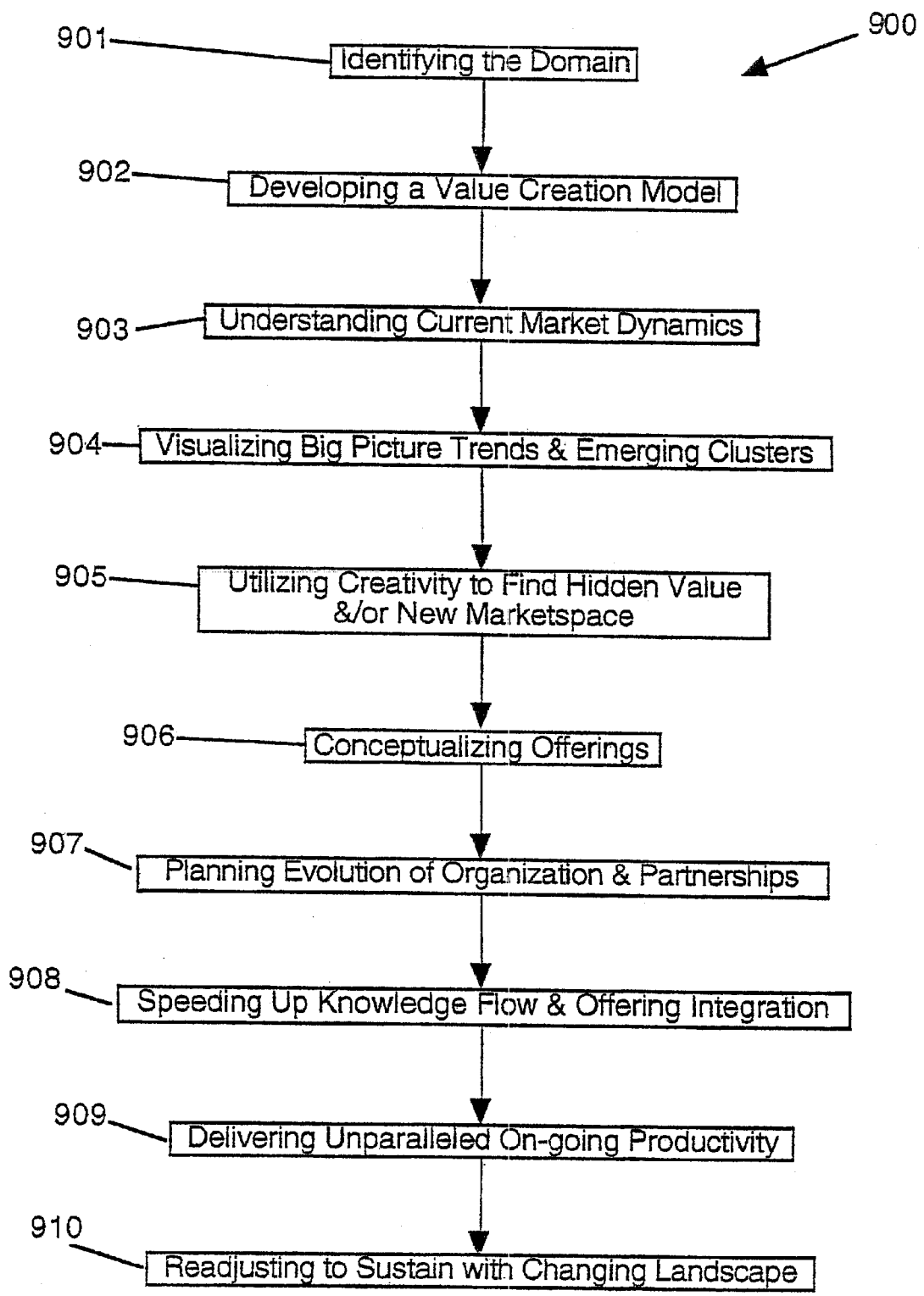
FIG. 9 is a schematic illustrating a preferred overall method of applying a value enhancement model according to my invention.

The basic methodology 900 of my system is broadly shown in FIG. 9. It includes identifying the domain 901, developing a value creation model 902, understanding current market dynamics 903, visualizing big picture trends and emerging clusters 904, utilizing creativity to find hidden value and/or new marketspace 905, conceptualizing offerings 906, planning the evolution of the organization and partnerships 907, speeding up knowledge flow and offering integration 908, delivering unparalleled on-going productivity 909, and readjusting the enterprise model and the enterprise value enhancement system so they can maintain viability in a changing business landscape 910.

My system takes into account the organization of the enterprise, the three areas of focus, and the three major categories of tools discussed above to provide solutions for enhancing the value of the enterprise. In a preferred implementation of my invention 100 as shown schematically in FIGS. 10–12, the core 101 of my invention 100 includes a value enhancement solution generator 102, a performance processor 103, a field feedback survey generator 104, a field feedback engine 105, a performance metrics engine 106, and a customer asset valuation processor 107, all of which are interconnected to each other and to various external systems, sources of information, and components through a switchboard 108. The switchboard 108 can be hardware or software based so long as it provides appropriate connectivity and/or routing functions for my system. My value enhancement solution generator 102 generates the solutions themselves and also delivers linkages to specific functions of the enterprise via the switchboard 108. The performance processor 103 receives information from various sources, which preferably include field feedback from the field feedback engine 105 and information from the performance metrics engine 106, the customer asset valuation processor 107, and databases 109. The performance process or then assimilates the information it receives, processes linkages, and forms clusters of elemental information related to performance of the enterprise. The performance processor 103 then sends the information about the performance of the enterprise to the solution generator 102.

One duty of the switchboard 108, as mentioned above, is importation of data into the processing system core 101 from databases 109 containing information about the company. I prefer to import data from multiple databases, if available, including those relating to human resources information 1091, customer information 1092, supplier information 1093, and financial information 1094. These databases can also include information relating to operations 1095, a best practices library 1096, and a marketing encyclopedia 1097. Another function the switchboard 108 can perform is interaction with, including data importation to and from, various systems 110 within the enterprise, such as enterprise resource planning systems 1101, customer relationship management systems 1102, sales force automation systems 1103, and electronic messaging systems 1104. Additionally, the switchboard 108 can interact with mass storage devices 111 that can act as a knowledge warehouse, online services 112, such as online market research 1121 and online business news 1122, and strategic planning processors 113. Further, the switchboard 108 can link the core 101 to one or more interactive expert systems 114 and one or more user interfaces 115, including workstations 1151, laptop or otherwise mobile computers 1152, and personal digital assistants 1153. Other input devices at the user interface 115 or elsewhere in the system, such as scanners, smart cards, and bar code readers (one- and two-D), can also be used. Any or all of the systems and devices to which the switchboard 108 can be connected can be remote, and the switchboard can communicate with them via conventional copper wire, fiber optic links, telephone, radio or other E-M transmissions, intranets, and/or the Internet, or any other suitable communications medium. The system in general and the switchboard specifically can additionally employ cryptography to protect information handled by the system and its components.

The customer asset valuation processor 107 dynamically computes asset value and assigns any attributes to the assets that the user might desire. To allow user input of essential information, I include an input device or user interface 115, such as a workstation 1151, including a terminal with a monitor and a keyboard, interacting with the field feedback engine 105. Preferably, the user interacts with the field feedback engine 105 through the field feedback survey administrator interface that prompts the user for information based on a field feedback survey. The field feedback survey is created by the field feedback survey generator 104 that creates, renews, updates, and processes the surveys.

The input device preferably sends field feedback to the field feedback engine 105 that uses a field survey administrator interface as mentioned above. The input for the field feedback engine 105 is in the form of the electronic field feedback survey that further feeds solution sets to the performance processor 103. The performance processor 103 analyzes the feedback from the field using regression or other similar analysis to determine the highest confidence measures of success for particular solutions. Based on the input and the confidence measures, the system 100 produces a given set of results and uses those solutions with the highest certainty factors in the performance processor 103 to map solutions to causals and functions of the enterprise, which can be sent to the user interface 115 for display. I prefer to equip the field feedback engine 105 with a device such as a microprocessor to compute and update the degree of frequency of certain solution applications resulting in specific performance on a real time basis. Thus, my system 100 determines the degree of certainty and renders the engine 105 capable of storing information pertaining to any deviations together with explanations.

The field feedback survey generator 104 processes, renews, and updates enterprise value enhancement solution surveys. The generator 104 is capable of generating modified surveys to be used in the future to capture competitive market trends, identify new areas requiring focus, assimilate disruptive technologies in the marketplace, and generally aid in developing input for strategic planning. Preferably, my field feedback survey generator 104 sends field surveys automatically at preset frequencies to update current state and desired states and to collect newly relevant information.

Preferably, the performance metrics engine 106 keeps track of the appropriate metrics of the enterprise. For best results, my performance metrics engine 106 also monitors the direction of movement of certain metrics and the accuracy of projections with reality over time to determine the dependability and applicability of metrics as measurement indicators. The performance metrics engine 106 can also allow updating of metrics, changing metrics over time, and changing metrics as the enterprise strategy changes. Additionally, I prefer to enable the customer asset valuation processor 107 to receive information from expert consulting databases 114. The customer asset valuation processor 107 then sends information about the value of customer assets to the performance processor 103 as described above.

My value enhancement solution generator 107 delivers recommended solutions for value enhancement of the enterprise, with linkages to specific functions. The solutions are displayed through the user interface 115 when complete. The steps in determining the enterprise value enhancement solutions include several planning loop structures.

My solution generator also tracks the mix of products and/or services of the enterprise. Pricing, gross margins, customer asset valuations, and the potential for movement in each of the areas tracked are also preferably monitored by the solution generator.

Previously used expert solutions that have been field tested are used to analyze the financial performance of the enterprise. Preferably, these expert solutions have been refined over time to ensure their successful implementation to the enterprise.

Figure 10:
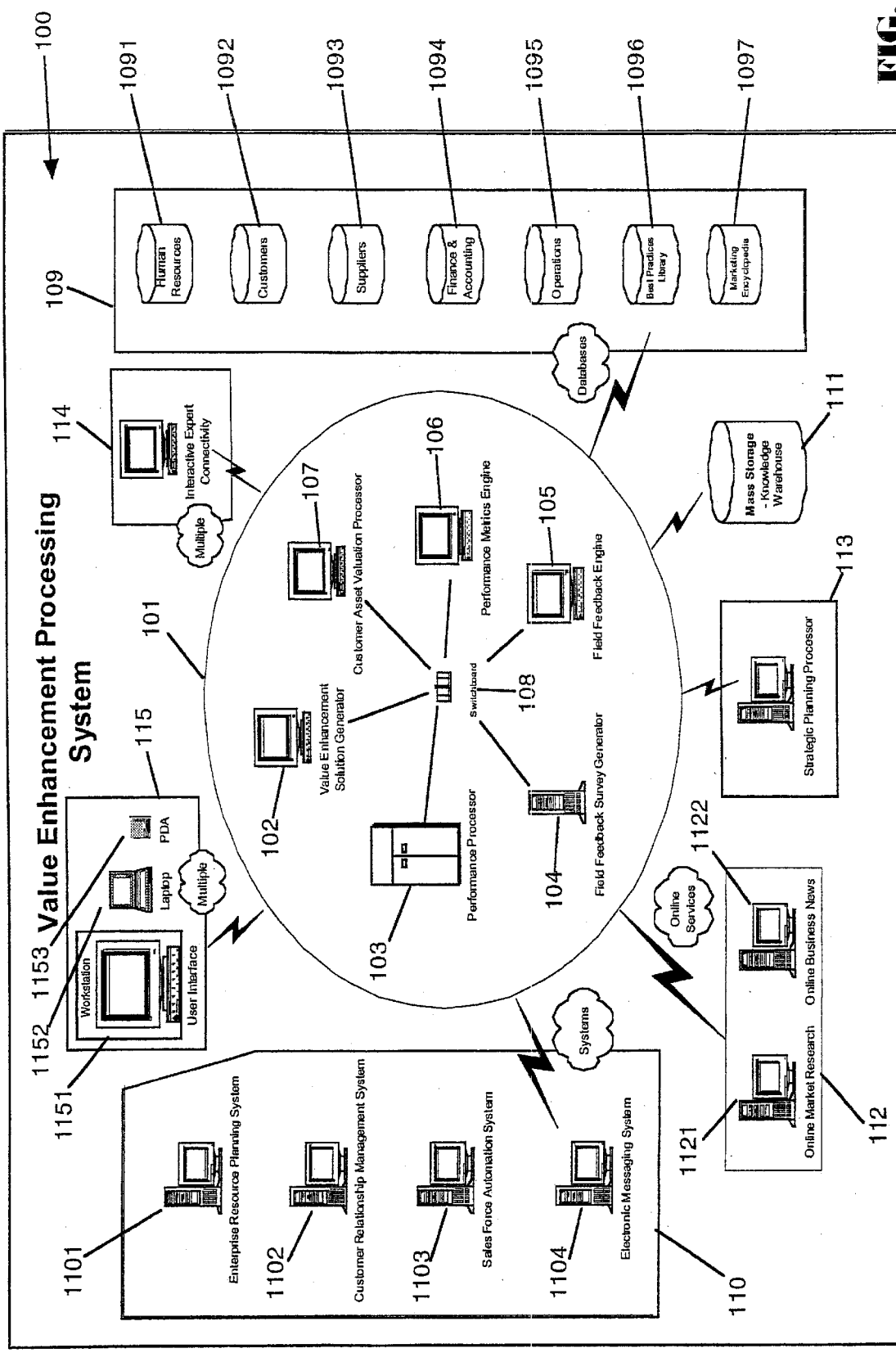
FIG. 10 is a schematic diagram of the overall implementation of my invention.
Figure 11:
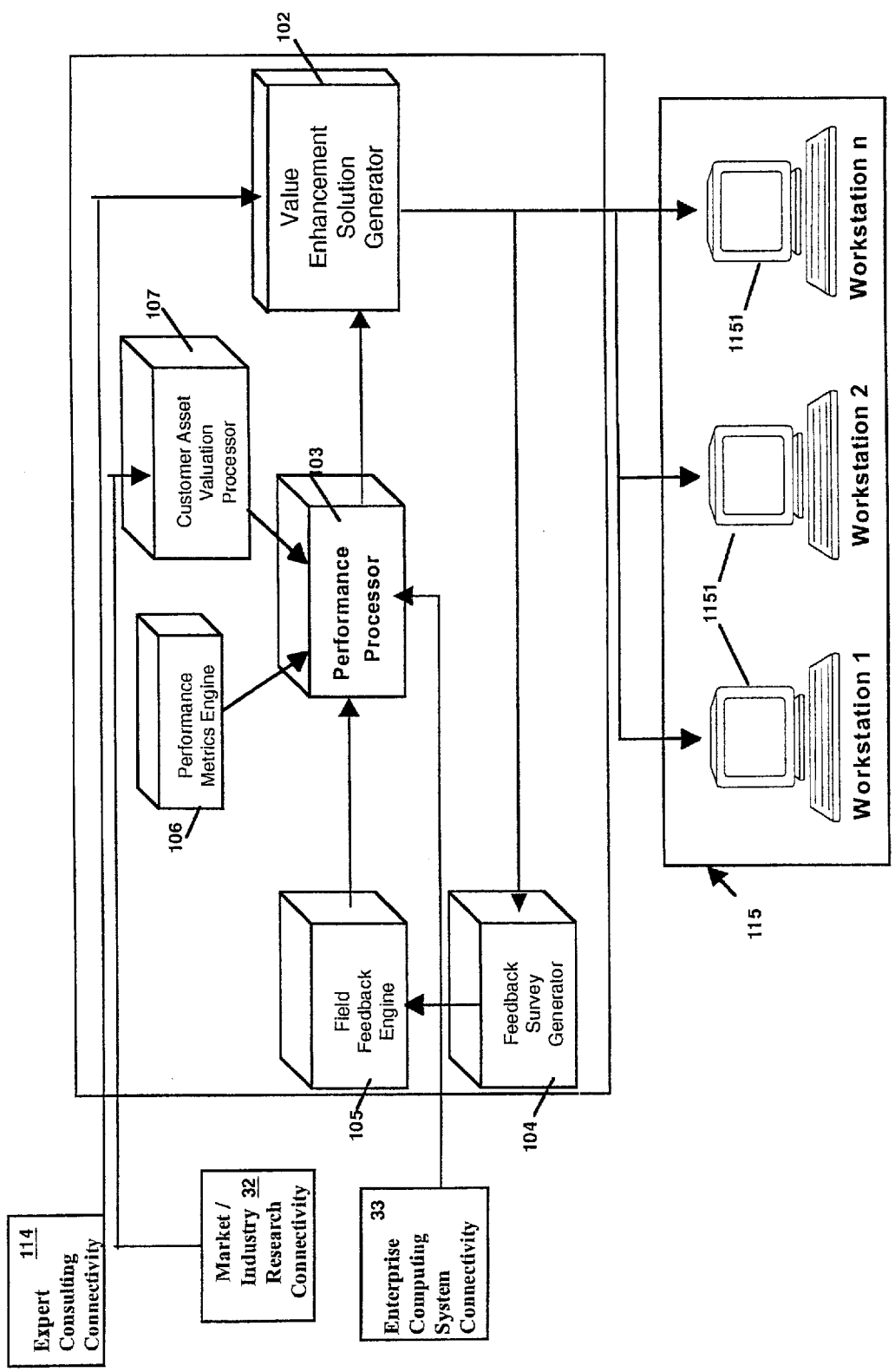
FIG. 11 is a schematic diagram representing an implementation of my invention in a distributed information system and is a subset of the implementation shown in FIG. 10.
Figure 12:
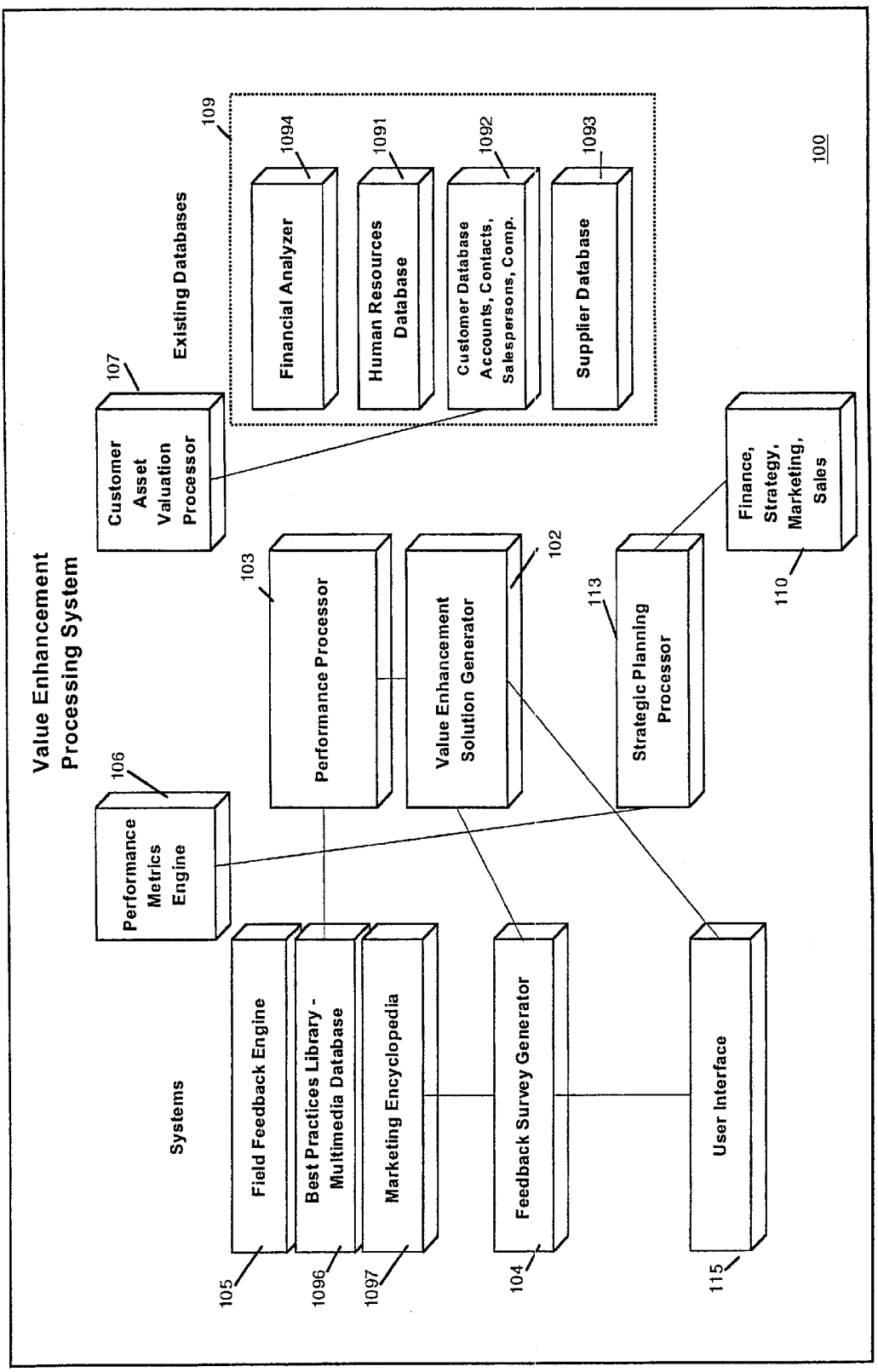
FIG. 12 is a schematic diagram illustrating the functional relationships of various elements of my processing system and is a subset of the implementation shown in FIG. 10.

As seen in FIGS. 10–12, and as mentioned above, the system also preferably is interconnected with one or more strategic planning processors 113. In this case, each strategic planning processor 113 is preferably further connected to a financial analyzer or the finance database 1094, a human resources database 1091, customer and supplier databases 1092, 1093, a best practices library 1096, and the marketing encyclopedia 1097 of the enterprise to provide real time updated information regarding new internal and external trends and other inputs related to the strategy of the enterprise. The strategic planning processor 113 also preferably interacts with the field feedback engine 105, the performance metrics engine 106, and other systems 110 of the enterprise.

The planning loop structures accept user interaction through the user interface 115 with the processing system 100 where the user identifies accounts of interest. An interface such as the field feedback survey administration interface created by the field feedback survey generator 104 is preferred. The accounts are preferably ranked by a particular prioritization or desired state identifying causals for the present state. Solutions from field feedback, from management experts contained in a library of best practices or through a linkage to a different system, from a marketing encyclopedia, and from strategic planning initiatives are applied. Recommendations on customer relationships and other process improvements based on the type of desired state sought are made.

Figure 13:
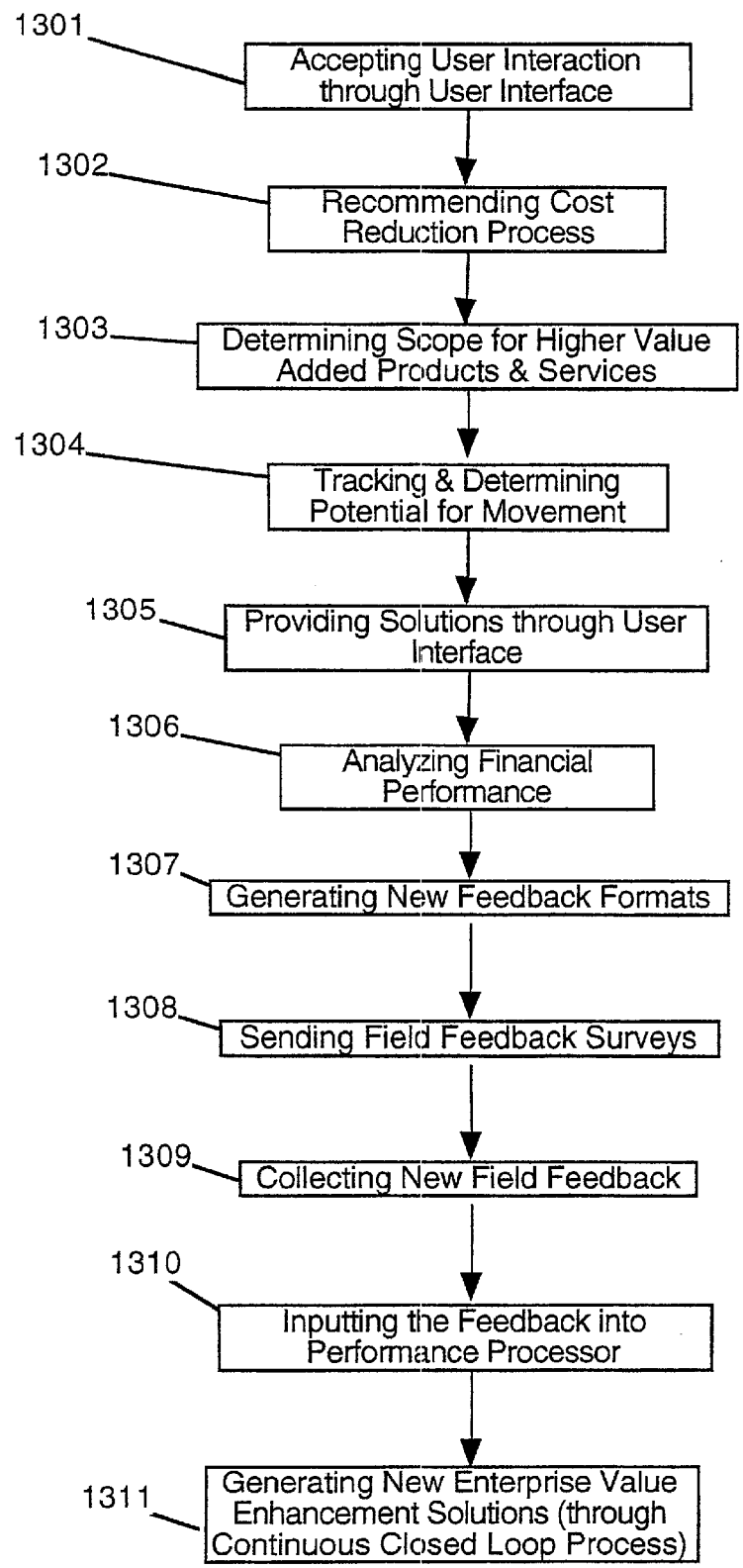
FIG. 13 is a schematic diagram illustrating the method performed by an exemplary planning loop structure.

More specifically, as seen in FIG. 13, each planning loop structure accepts user interaction through the user interface 1301 with the processing system for identifying accounts the user ranks according to a particular prioritization or desired state. The user (or the system) identifies causals for the present state applying solutions from field feedback applying solutions from management experts contained in a library of best practices or through a linkage to a different system. Alternatively, the solutions can be retrieved from at least one of a management system, a sales force automation system, a marketing encyclopedia, or from strategic planning initiatives yielding recommendations on customer relationship and other process improvements based on the type of desired state sought.

Each planning loop structure recommends a cost reduction process 1302 for cost of goods/services and for selling and general administrative expenses, determining potential for balanced capacity utilization of employees, equipment, output of goods and services, and outsourced sources. Next each structure determines the scope for higher value added products and services 1303. The structure also tracks and determines a potential for movement 1304 in the product and services mix, pricing, gross margins, customer asset valuations, employee productivity, and market valuation per employee of the enterprise. Different function groups in the enterprise then receive the solutions 1305 through the user interface, such as a number of workstations.

The planning loop structure analyzes financial performance 1306 based on the application of field tested and expert solutions refined over time and as applicable to the enterprise, generates new feedback formats 1307, and sends field feedback surveys 1308 automatically at preset frequencies for updating current state and desired states and for collection of newly-relevant information. It then collects new field feedback 1309, inputs the feedback into the performance processor 1310, and generates new enterprise value enhancement solutions 1311 through a continuous closed loop process, thus renewing the potential for incremental value creation in successive time periods.

Combinations of planning loop structures recommend a cost reduction process for the cost of goods and/or services, as well as costs involved with selling and general administrative expenses. Here the planning loop structures also determine the potential for balanced capacity utilization determining scope for higher value added products and services.

TABLE 1

| Company | Symbol | Business | Employees | Sales ($M) | Market Val | SG (5 Yr.) | MV/Emp. ($M) |
|---|---|---|---|---|---|---|---|
| Stack Ranking by 5 Yr. Sales Growth Rate (SG) | | | | | | | |
| DNAP Holding Corp. | DNAP | Agribusiness | 589 | 274 | 72 | 956 | 0.12 |
| Risk Capital Holdings | RCHI | Casualty Reinsurance | 37 | 142 | 411 | 908 | 11.11 |
| Healthdyne Information Enterprises | HDIE | Computer Integration Systems De | 127 | 117 | 75 | 927 | 0.59 |
| Vanguard Airline | VNGD | Low-fare Passenger Airline | 486 | 81 | 64 | 849 | 0.13 |
| Arqule | ARQL | Pharmaceutical Preparations | 159 | 20 | 158 | 824 | 0.99 |
| Iona Technologies | IONAY | Software & Programming | 252 | 49 | 683 | 309 | 2.71 |
| EMC Corp. | EMC | Computer Storage Devices | 6400 | 3200 | 22300 | 182 | 3.48 |
| Stack Ranking by 5 Yr. Income Growth Rate (IG) and Earnings Growth Rate (EG) | | | | | | | |
| Risk Capital Holdings | RCHI | Casualty Reinsurance | 37 | 142 | 411 | 908 | 11.11 |
| Remedy | RMDY | Software | 226 | 137 | 472 | 132 | 2.09 |
| Innnovex | INVX | Electronic Components | 893 | 134 | 192 | 41 | 0.22 |
| Sapient Software | sAPE | Web-based Applications | 817 | 102 | 1370 | 162 | 1.68 |
| Smart Modular Technologies | SMOD | Semiconductors | 636 | 804 | 635 | 124 | 1.00 |
| RTW | RTWI | Marine Insurance | 302 | 92 | 91 | 107 | 0.30 |
| CKS Group | CKSG | Business Services | 271 | 145 | 356 | 71 | 1.31 |
| Radisys | RSYS | Process Control | 511 | 131 | 166 | 68 | 0.32 |
| Wyndham Hotel Corp. | WYN | Since Merged | 11400 | 148 | 971 | 27 | 0.09 |
| ITT Corp. | ITT | Since Merged | 38000 | 6225 | 8700 | 12 | 0.23 |

TABLE 2

Stack Ranking by Sales, Income & Earnings Growth —>100% (each), >$1M Cash from Ops. & <1500 Employees

| Company | Symbol | Business | Employees | Sales (%M) | Market Val | MV/Emp. ($M) |
|---|---|---|---|---|---|---|
| Arterial Vascular Engineering | AVEI | Medical Equipment & Supplies | 869 | 228 | 2400 | 2.76 |
| Amer Disposal | ADSI | Solid Waste Services | 1000 | 148 | 1000 | 1.00 |
| Andrx Corp. | ADRX | Controled Release Drugs | 385 | 170 | 568 | 1.48 |
| Vantive Corp. | VNTV | Front-office Automation | 351 | 131 | 360 | 1.03 |
| Newcom | NWCM | Computer Peripherals | 73 | 94 | 88 | 1.21 |
| Also, RCHI, RMDY, SAPE and SMOD | | From Above | | | | |

Stack Ranking of High Earnings Growth Business Services Companies - Profit-making & <1000 Employees

| Company | Symbol | Business | Employees | Sales ($M) | Market Val | SG (5 Yr.) | MV/Emp. ($M) |
|---|---|---|---|---|---|---|---|
| Diamond Technology Partners | DTPI | Consulting | 180 | 58 | 280 | 424 | 1.56 |
| Aris Corp. | ARSC | Computer Related Services | 593 | 66 | 308 | 87 | 0.52 |
| Forrester Research | FORR | Market Research | 240 | 45 | 240 | 61 | 1.00 |
| Metagroup | METG | Information Services | 310 | 56 | 247 | 49 | 0.80 |
| Identix | IDX | Computer Peripherals | 143 | 74 | 167 | 45 | 1.17 |
| SOS Staffing | SOSS | Staffing & Consulting | 776 | 239 | 231 | 35 | 0.30 |

TABLE 3

Information

Market Value per Employee of the 2 most valuable companies
    ☐ GE      $300B      1.1      %M/Emp.
    ☐ Microsoft      $275B      12.4      $M/Emp.
Less than 0.5% of all companies have market value/employee >$1M
Less than 10 companies have market value/employee >$2M

What is claimed is:

1. A processing system comprising:
   a. an input device that selectively requests and allows input of field feedback via field feedback surveys;
   b. a field feedback survey generator that receives the field feedback and processes, renews and updates enterprise value enhancement solution surveys based on the field feedback, the field feedback survey generator further generating the field feedback surveys used by the input device and updating the field feedback surveys;
   c. a switchboard that imports data from at least one database relating to one or more of financial information, human resources information, customer information, supplier information, and industry, market or specialized expert information via multimedia databases into the processing system;
   d. a performance processor that assimilates the field feedback and the data imported by the switchboard to process linkages between the data, form clusters of elemental information, and make appropriate computations, associations, and new linkages;
   e. a customer asset valuation processor that can receive customer and other relevant information including information and meta information about customer needs, requirements, desired states, and assets from the switchboard, the customer asset valuation processor dynamically computing an asset value of the customer assets and assigning attributes to the customer assets as necessary;
   f. a performance metrics engine that keeps track of a first set of metrics, the direction of movement of a second set of metrics that are a subset of the first set of metrics, and the accuracy of projections of the values of the first set of metrics as compared to actual change of the first set of metrics over time to determine the dependability and applicability of the first set of metrics as indicators of enterprise performance and for measurement thereof; and
   g. a value enhancement solution generator that receives data from the field feedback survey generator, the switchboard, the performance processor, the customer asset valuation processor, and the performance metrics engine, generates value enhancement solutions based on these data, and delivers recommended solutions for value enhancement of the enterprise, with linkages to specific functions.

2. The processing system of claim 1 wherein at least one of an enterprise computing system and an enterprise resource planning system is interconnected to the processing system.

3. The processing system of claim 1 wherein a multimedia database of best practices is interconnected to the processing system and the switchboard imports data from this multimedia database.

4. The processing system of claim 1 wherein at least one of a multimedia database of training materials and marketing encyclopedias, a relationship management system, and a sales force automation system is interconnected to the processing system and the switchboard imports data from this multimedia database.

5. The processing system of claim 1 wherein a strategic planning processor is interconnected to the processing system, receives data from the switchboard, and sends strategic data to the value enhancement solution generator.

6. The processing system of claim 1 wherein an online interactive multimedia expert advice-providing system including a multimedia database is interconnected to the processing system and the switchboard imports data from this multimedia database.

7. The processing system of claim 1 wherein the switchboard is automated to perform specified tasks as one of a back-end service and a front-end service with front-end interactive features-through a user interface.

8. The processing system of claim 1 wherein the value enhancement solution generator computes factors contributing to the dependencies and linkages of value enhancement solutions based on the functionality of knowledge activity.

9. The processing system of claim 8 wherein the functionality of knowledge activity includes knowledge generation, knowledge communication, and knowledge distribution within the enterprise, including simulations thereof, as they relate to value enhancement.

10. The processing system of claim 9 wherein the knowledge generation, knowledge communication, and knowledge distribution are related to value enhancement through one of a polynomial mathematical equation and a relationship, the solution to which is a partial differential equation, and includes a third set of metrics that is a subset of the first set of metrics.

11. The processing system of claim 10 wherein the third set of metrics includes revenue growth, profit growth, market valuation growth, market valuation per employee growth, market share growth, customer asset value growth, and level of knowledge activity growth.

12. The processing system of claim 10 wherein the polynomial mathematical equation is a six dimensional second order equation.

13. The processing system of claim 1 wherein the dependencies and linkages of value enhancement solutions depend on factors that are computed based on the functionality of knowledge activity, customer asset valuation, and the respective growth rates of the functionality of knowledge activity and customer asset valuation coupled with financial measures relating to revenue, profit, market valuation, market valuation per employee, and market share.

14. The processing system of claim 1 wherein connectivity to other systems and the various links are secure and web-based, including web-based links utilizing extensible markup language, active server programming languages, and connective technology languages, which assign descriptors and tags to data types and/or aid in the interfacing of hardware and software, and the processing is done online, in real time, across the enterprise.

15. The processing system of claim 14 wherein the processing is done with the use of at least one of intelligent agents, application of fuzzy logic, case-based reasoning, and neural networks.

16. The processing system of claim 15 wherein the intelligent agents are application software agents that perform tasks remotely.

17. The processing system of claim 14 wherein the processing is interactive and encompasses data input by multiple simultaneous users of the system.

18. The processing system of claim 14 wherein the processing is done through application of fuzzy logic.

19. A computer based method to determine the most appropriate enterprise actions and solution sets delivering increased value enhancement, the method including the steps of:
   creating a value enhancement model of the enterprise based on planning loop structures, the planning loop structures each being a dynamic frame-based model wherein:
      each frame represents an aspect of enterprise financial and market performance, knowledge activity, customer asset information, employee information, and market information;
      each frame includes a list of relationships, each relationship specifying a relationship with another frame; and
      each frame further comprising a list of attributes that capture, store and update data in real time relating to the particular frame, the attributes including at least one of dynamic states, events, and actions;
   continuously updating and refining the value enhancement model of the enterprise in a multimedia complex networked database;
   providing a set of causals, logical explanations, and reconciliation rules to link types of enterprise activities to causals, causals to functions, and functions to solutions based upon field feedback;
   accepting input from a field survey administrator through an interface;
   providing a method of generating new field feedback surveys to capture tacit and explicit knowledge of individuals by applying the previous field feedback and linking them to the types, causals, functions, solutions, and results from those solutions;
   accepting input pertaining to an account to determine key solutions for value enhancement as relevant to the account;
   applying the account specific information to the set of reconciliation rules of linkages between types, causals, functions and solutions;
   providing a set of variable solutions customized for at least one of specific target customer accounts, specific target supplier accounts, market segments by type of account, and market segments by type of offering, and for specific functions to be executed in order to enhance overall enterprise value.

20. The method of claim 19 wherein the model includes information from one or more of a financial analyzer of the enterprise, an enterprise-wide computing system, or an enterprise resource planning system.

21. The method of claim 19 wherein the model includes information about human resources.

22. The method of claim 21 wherein the information about human resources includes at least one of employee functions, relevant experience, training, knowledge and personality attributes, skills, capabilities, and contact information regarding the various individuals in the enterprise together with their current responsibilities, their position in the organizational structure, their current knowledge activity, current capability utilization, salaries, wages, benefits, and bonuses.

23. The method of claim 19 wherein the model includes information about customers.

24. The method of claim 23 wherein the information about customers includes at least one of the history of business with specific accounts, their buying patterns, their mix of products and services, pricing, competitive information, related contacts, and a history of customer interaction with the related contacts.

25. The method of claim 23 wherein the information about customers includes at least one of size, growth rates, and other financial performance criteria of the customer through at least one of a connectivity to a database containing such information and marketing information databases that can search for prospects based on specific matching criteria.

26. The method of claim 22 wherein the information about human resources includes information about at least one of compensation systems of the sales force and other employees of the enterprise, a mix of compensation by sales person, and a compensation formulas by type of offering and channel delivery.

27. The method of claim 19 wherein the model includes information about suppliers.

28. The method of claim 27 wherein the information about suppliers is provided to the model via a supplier database of the enterprise connected to the model.

29. The method of claim 19 wherein the model includes information about technology trends, demographics, the industry in general, and other externalities related to the specific product or service markets of the enterprise.

30. The method of claim 19 wherein the model includes information about a strategic planning process and overall marketing and financial strategies of the enterprise.

31. The method of claim 19 wherein the model of the enterprise value enhancement includes flow relationships, type relationships, causal relationships, function relationships, and solution relationships, the solution relationships being represented as at least one of object links and a structural model with at least one of elemental, generic, and modular structures.

32. The method of claim 19 wherein creation of the model of value enhancement includes the steps of:
   identifying a plurality of frames including a plurality of planning loop structures, each planning loop structure including a first set of objects;
   linking objects within the first set of objects to each other;
   assigning a set of attributes to each of the first set of objects within the planning loop structures with dynamic states;
   assigning a mathematical formula to each of the first set of objects, the planning loop structures thus linked, with attributes and dynamic states, events, and actions, and formulated yielding an expanded loop structure; and
   connecting the plurality of planning loop structures and the expanded loop structure to a financial analyzer, a human resources database, customer and supplier databases, the field feedback engine, the performance metrics engine, the customer valuation processor, and the feedback survey generator.

33. The method of claim 32 wherein the first set of objects includes elements that each represent points of generation of knowledge, speeds and spheres of communication of knowledge, transformation methodology, and distribution methodology of knowledge within the same and between various business systems in the enterprise.

34. The method of claim 32 wherein the model utilizes a field feedback survey generation method and incorporates field feedback into the value enhancement solution set.

35. The processing system of claim 1 wherein the field feedback survey generator generates modified surveys to be utilized in the future to capture competitive market trends, identify new areas requiring focus, assimilate upcoming and disruptive technologies in the marketplace, and generally aid in developing input for strategic planning.

36. The processing system of claim 1 wherein the field feedback survey generator analyzes the feedback from the field to determine the highest confidence measures of success for particular solutions to produce a given set of results and to send those solutions with the highest certainty factor to the performance processor to map solutions to the causals and functions through artificial intelligence, fuzzy logic, neural networks, expert systems, or otherwise using regression, sensitivity, statistical, or other similar analyses.

37. The processing system of claim 1 wherein the field feedback survey generator is equipped with a means for computing and updating on a real time basis the degree of frequency of certain solution applications resulting in specific performance and to thus determine a degree of certainty, the field feedback survey generator further being capable of storing information pertaining to any deviations together with explanations.

38. The processing system of claim 1 wherein a strategic planning processor is connected to a financial analyzer, a human resources database, customer and supplier databases, a best practices library, at least one of a explicit knowledge management system, a web based real time news service, a sales force automation system, a marketing encyclopedia of the enterprise to provide real time updated information regarding new internal and external trends and other inputs that relate to a strategy of the enterprise.

39. The processing system of claim 1 wherein the value enhancement solutions are derived using planning loop structures, each planning loop structure including the steps of:
   accepting a user interaction through a user interface with the processing system identifying accounts ranked by a particular prioritization or desired state identifying causals for the present state applying solutions from field feedback applying solutions from management experts contained in a library of best practices or through a linkage to a different system, from at least one of a management system and a sales force automation system, a marketing encyclopedia, and from strategic planning initiatives yielding recommendations on customer relationship and other process improvements based on the type of desired state sought;
   recommending a cost reduction process for cost of goods/services and for selling and general administrative expenses, determining potential for balanced capacity utilization of employees, equipment, output of goods and services, and outsourced sources;
   determining a scope for higher value added products and services;
   tracking and determining a potential for movement in each of product and services mix, pricing, gross margins, customer asset valuations, employee productivity, and market valuation per employee;
   providing solutions through the user interface to the different functional groups in the enterprise;
   analyzing financial performance based on the application of field tested and expert solutions refined over time and as applicable to the enterprise;
   generating new feedback formats;
   sending field feedback surveys automatically at preset frequencies for updating current state and desired states and for collection of newly- relevant information;
   collecting new field feedback;
   inputting the feedback into the performance processor; and
   generating new enterprise value enhancement solutions through a continuous closed loop process, thus renewing the potential for incremental value creation in successive time periods.

40. The processing system of claim 39 wherein the processing system is implemented as a secure web-based application on a computer network.

41. The processing system of claim 40 wherein the web flow includes web-accessible, web-enabled, and web-exploited functionality, embedded search engines, and workflows, as well as other integrated electronic document management system features.

42. The processing system of claim 40 wherein the computer network includes at least one of the internet, an intranets, an extranet, and a virtual private network that may use cryptographic clustering techniques.

43. The processing system of claim 40 wherein the computer network includes wireless remote connectivity to the processing system.

44. A processing system comprising:
a. an input device that selectively requests and allows input of field feedback via field feedback surveys;
b. a field feedback survey generator that receives the field feedback and processes, renews and updates enterprise value enhancement solution surveys based on the field feedback, the field feedback survey generator further generating the field feedback surveys used by the input device and updating the field feedback surveys;
c. a switchboard that imports data from at least one database relating to one or more of financial information, human resources information, customer information, supplier information, and industry, market or specialized expert information via multimedia databases into the processing system;
d. a performance processor that assimilates the field feedback and the data imported by the switchboard to process linkages between the data, form clusters of elemental information, and make appropriate computations, associations, and new linkages;
e. a customer asset valuation processor that can receive customer and other relevant information including information and meta information about customer needs, requirements, desired states, and assets from the switchboard, the customer asset valuation processor dynamically computing an asset value of the customer assets and assigning attributes to the customer assets as necessary;
f. a performance metrics engine that keeps track of a first set of metrics, the direction of movement of a second set of metrics that are a subset of the first set of metrics, and the accuracy of projections of the values of the first set of metrics as compared to actual change of the first set of metrics over time to determine the dependability and applicability of the first set of metrics as indicators of enterprise performance and for measurement thereof; and
g. a value enhancement solution generator that receives data from the field feedback survey generator, the switchboard, the performance processor, the customer asset valuation processor, and the performance metrics engine, generates value enhancement solutions based on these data, and delivers recommended solutions for value enhancement of the enterprise, with linkages to specific functions;
the processing system executing a computer based method to determine the most appropriate enterprise actions and solution sets delivering increased value enhancement, the method including the steps of:
creating a value enhancement model of the enterprise based on planning loop structures, the planning loop structures each being a dynamic frame-based model wherein:
each frame represents an aspect of enterprise financial and market performance, knowledge activity, customer asset information, employee information, and market information;
each frame includes a list of relationships, each relationship specifying a relationship with another frame; and
each frame further comprising a list of attributes that capture, store and update data in real time relating to the particular frame, the attributes including at least one of dynamic states, events, and actions;
continuously updating and refining the value enhancement model of the enterprise in a multimedia complex networked database;
providing a set of causals, logical explanations, and reconciliation rules to link types of enterprise activities to causals, causals to functions, and functions to solutions based upon field feedback;
accepting input from a field survey administrator through an interface;
providing a method of generating new field feedback surveys to capture tacit and explicit knowledge of individuals by applying the previous field feedback and linking them to the types, causals, functions, solutions, and results from those solutions;
accepting input pertaining to an account to determine key solutions for value enhancement as relevant to the account;
applying the account specific information to the set of reconciliation rules of linkages between types, causals, functions and solutions; and
providing a set of variable solutions customized for at least one of specific target customer accounts, specific target supplier accounts, market segments by type of account, and market segments by type of offering, and for specific functions to be executed in order to enhance overall enterprise value.

45. The processing system executing a computer based method according to claim 44 wherein the value enhancement solutions are warehoused in a multimedia data warehouse for the creation of an improved knowledge base and best practices library taking into account changing times and changing industry trends, the improved knowledge base being connectable to the processing system, including connections made by wireless remote connectivity for mass storage and retrieval of solutions.

46. The processing system executing a computer based method according to claim 44 wherein the processing system is interconnected to a simulation software system for at least one of modeling, visualizing, simulating, decision programming, computing, and other purposes, or to a math processor for multidimensional analysis and representation.

47. The processing system executing a computer based method according to claim 44 wherein the system is interconnected to at least one of an automated testing system, a software robot application, a collaborative system, an electronic messaging system, and an enterprise application integrator.

48. The processing system executing a computer based method according to claim 44 wherein the processing system is interconnected to a voice messaging system for at least one of capture of data and communication of solutions in audio and text form through at least one of a land line, a wireless remote digital connection, and a web-telephony connection.

49. The processing system executing a computer based method according to claim 44 wherein the processing system is interconnected to a video streaming system or a visual communication system utilizing compression for at least one of capture of data and communication of solutions, including where done automatically through links to other databases.

50. The processing system executing a computer based method according to claim 44 wherein creation of the model of value enhancement includes the steps of:
identifying a plurality of frames including a plurality of planning loop structures, each planning loop structure including a first set of objects;
linking objects within the first set of objects to each other;
assigning a set of attributes to each of the first set of objects within the planning loop structures with dynamic states;

assigning a mathematical formula to each of the first set of objects, the planning loop structures thus linked, with attributes and dynamic states, events, and actions, and formulated yielding an expanded loop structure; and connecting the plurality of planning loop structures and the expanded loop structure to a financial analyzer, a human resources database, customer and supplier databases, the field feedback engine, the performance metrics engine, the customer valuation processor, and the feedback survey generator.

51. The processing system executing a computer based method according to claim 50 wherein the value enhancement solutions are warehoused in a multimedia data warehouse for the creation of an improved knowledge base and best practices library taking into account changing times and changing industry trends, the improved knowledge base being connectable to the processing system, including connections made by wireless remote connectivity for mass storage and retrieval of solutions.

52. The processing system executing a computer based method according to claim 50 wherein the processing system is interconnected to a simulation software system for at least one of modeling, visualizing, simulating, decision programming, computing, and other purposes, or to a math processor for multidimensional analysis and representation.

53. The processing system executing a computer based method according to claim 50 wherein the processing system is interconnected to at least one of an automated testing system, a software robot application, a collaborative system, an electronic messaging system, and an enterprise application integrator.

54. The processing system executing a computer based method according to claim 50 wherein the processing system is interconnected to a voice messaging system for at least one of capture of data and communication of solutions in audio and text form through at least one of a land line, a wireless remote digital connection, and a web-telephony connection.

55. The processing system executing a computer based method according to claim 50 wherein the processing system is interconnected to a video streaming system or a visual communication system utilizing compression for at least one of capture of data and communication of solutions, including where done automatically through links to other databases.

56. A processing system comprising:
   a. an input device that selectively requests and allows input of field feedback via field feedback surveys;
   b. a field feedback survey generator that receives the field feedback and processes, renews and updates enterprise value enhancement solution surveys based on the field feedback, the field feedback survey generator further generating the field feedback surveys used by the input device and updating the field feedback surveys;
   c. a switchboard that imports data from at least one database relating to one or more of financial information, human resources information, customer information, supplier information, and industry, market or specialized expert information via multimedia databases into the processing system;
   d. a performance processor that assimilates the field feedback and the data imported by the switchboard to process linkages between the data, form clusters of elemental information, and make appropriate computations, associations, and new linkages;
   e. a customer asset valuation processor that can receive customer and other relevant information including information and meta information about customer needs, requirements, desired states, and assets from the switchboard, the customer asset valuation processor dynamically computing an asset value of the customer assets and assigning attributes to the customer assets as necessary;
   f. a performance metrics engine that keeps track of a first set of metrics, the direction of movement of a second set of metrics that are a subset of the first set of metrics, and the accuracy of projections of the values of the first set of metrics as compared to actual change of the first set of metrics over time to determine the dependability and applicability of the first set of metrics as indicators of enterprise performance and for measurement thereof; and
   g. a value enhancement solution generator that receives data from the field feedback survey generator, the switchboard, the performance processor, the customer asset valuation processor, and the performance metrics engine, generates value enhancement solutions based on these data, and delivers recommended solutions for value enhancement of the enterprise, with linkages to specific functions;

the processing system deriving the value enhancement solutions using planning loop structures, each planning loop structure being a method including the steps of:
   accepting a user interaction through a user interface with the processing system identifying accounts ranked by a particular prioritization or desired state identifying causals for the present state applying solutions from field feedback applying solutions from management experts contained in a library of best practices or through a linkage to a different system, from at least one of a management system and a sales force automation system, a marketing encyclopedia, and from strategic planning initiatives yielding recommendations on customer relationship and other process improvements based on the type of desired state sought;
   recommending a cost reduction process for cost of goods/services and for selling and general administrative expenses, determining potential for balanced capacity utilization of employees, equipment, output of goods and services, and outsourced sources;
   determining a scope for higher value added products and services;
   tracking and determining a potential for movement in each of product and services mix, pricing, gross margins, customer asset valuations, employee productivity, and market valuation per employee;
   providing solutions through the user interface to the different functional groups in the enterprise;
   analyzing financial performance based on the application of field tested and expert solutions refined over time and as applicable to the enterprise;
   generating new feedback formats;
   sending field feedback surveys automatically at preset frequencies for updating current state and desired states and for collection of newly- relevant information;
   collecting new field feedback;
   inputting the feedback into the performance processor; and
   generating new enterprise value enhancement solutions through a continuous closed loop process, thus renewing the potential for incremental value creation in successive time periods.

57. The processing system deriving value enhancement solutions with planning loop structures according to claim 56 wherein the processing system is implemented as a secure web-based application on a computer network including at least one of the internet, an intranet, an extranet, and a virtual private network capable of employing cryptographic clustering techniques, the value enhancement solutions are warehoused in a multimedia data warehouse for the creation of an improved knowledge base and best practices library taking into account changing times and changing industry trends, the improved knowledge base being connectable to the processing system, including connections made by wireless remote connectivity for mass storage and retrieval of solutions.

58. The processing system deriving value enhancement solutions with planning loop structures according to claim 56 wherein the processing system is interconnected to a simulation software system for at least one of modeling, visualizing, simulating, decision programming, computing, and other purposes, or to a math processor for multidimensional analysis and representation.

59. The processing system deriving value enhancement solutions with planning loop structures according to claim 56 wherein the system is interconnected to at least one of an automated testing system, a software robot application, a collaborative system, an electronic messaging system, and an enterprise application integrator.

60. The processing system deriving value enhancement solutions with planning loop structures according to claim 56 wherein the processing system is interconnected to a voice messaging system for at least one of capture of data and communication of solutions in audio and text form through at least one of a land line, a wireless remote digital connection, and a web-telephony connection.

61. The processing system deriving value enhancement solutions with planning loop structures according to claim 56 wherein the processing system is interconnected to a video streaming system or a visual communication system utilizing compression for at least one of capture of data and communication of solutions, including where done automatically through links to other databases.

* * * * *